US011729156B2

(12) United States Patent
Jin

(10) Patent No.: US 11,729,156 B2
(45) Date of Patent: Aug. 15, 2023

(54) METHOD AND APPARATUS FOR COMMUNICATION BETWEEN INTERNET OF THINGS DEVICES

(71) Applicant: Alibaba Group Holding Limited, Grand Cayman (KY)

(72) Inventor: Haifeng Jin, Hangzhou (CN)

(73) Assignee: Alibaba Group Holding Limited

( * ) Notice: Subject to any disclaimer, the term of this patent is extended or adjusted under 35 U.S.C. 154(b) by 62 days.

(21) Appl. No.: 17/072,608

(22) Filed: Oct. 16, 2020

(65) Prior Publication Data

US 2021/0036999 A1 Feb. 4, 2021

Related U.S. Application Data

(63) Continuation of application No. PCT/CN2019/082261, filed on Apr. 11, 2019.

(30) Foreign Application Priority Data

Apr. 17, 2018 (CN) .......................... 201810343519.8

(51) Int. Cl.
*H04L 29/06* (2006.01)
*H04L 9/40* (2022.01)
*G16Y 30/10* (2020.01)

(52) U.S. Cl.
CPC ............ *H04L 63/065* (2013.01); *G16Y 30/10* (2020.01); *H04L 63/062* (2013.01); *H04L 63/0823* (2013.01); *H04L 63/126* (2013.01)

(58) Field of Classification Search
CPC . H04L 63/065; H04L 63/062; H04L 63/0823; H04L 63/126; G16Y 30/10
See application file for complete search history.

(56) References Cited

U.S. PATENT DOCUMENTS 6,263,441 B1 * 7/2001 Cromer ................ G06F 11/327
714/E11.187
9,413,827 B2 8/2016 Sharma et al.
(Continued)

FOREIGN PATENT DOCUMENTS

| CN | 101873588 A | 10/2010 |
|---|---|---|
| CN | 103475624 | 12/2013 |

(Continued)

OTHER PUBLICATIONS

Translation of International Search Report for corresponding PCT Application No. PCT/CN2019/082261 dated Jul. 10, 2019, a counterpart foreign application for U.S. Appl. No. 17/072,608, 2 pages.

(Continued)

*Primary Examiner* — Phy Anh T Vu
(74) *Attorney, Agent, or Firm* — Lee & Hayes, P.C.

(57) ABSTRACT

A method including establishing a communication connection of a first Internet of Things device with a trusted device; acquiring a first communication key, the first communication key being provided to the first Internet of Things device and/or a second Internet of Things device via the trusted device; performing, on the basis of the first communication key, encrypted communication with the second Internet of Things device, thereby ensuring that the first Internet of Things device and the second Internet of Things device are capable of acquiring the first communication key, and performing encrypted communication on the basis of the first communication key, thus enhancing the security and reliability of communication between the first Internet of Things device and the second Internet of Things device.

20 Claims, 9 Drawing Sheets

(56) References Cited

U.S. PATENT DOCUMENTS

| | | | |
|---|---|---|---|
| 9,680,726 B2 | 6/2017 | Sharma et al. | |
| 9,754,097 B2 | 9/2017 | Hessler | |
| 9,762,556 B2 | 9/2017 | James et al. | |
| 9,847,961 B2 | 12/2017 | Shuman et al. | |
| 9,853,826 B2 | 12/2017 | Shuman et al. | |
| 9,900,171 B2 | 2/2018 | Guedalia et al. | |
| 9,900,172 B2 | 2/2018 | Goel et al. | |
| 9,973,535 B2 | 5/2018 | Maher et al. | |
| 10,158,536 B2 | 12/2018 | Kim et al. | |
| 10,171,586 B2 | 1/2019 | Shaashua et al. | |
| 10,412,064 B2 | 9/2019 | Funk | |
| 10,419,930 B2 * | 9/2019 | Holland | H04W 12/069 |
| 10,447,683 B1 * | 10/2019 | Loladia | H04W 12/71 |
| 10,469,464 B2 * | 11/2019 | Smith | H04L 9/0825 |
| 10,911,224 B1 * | 2/2021 | Marappan | H04W 12/106 |
| 2009/0287922 A1 * | 11/2009 | Herwono | H04L 9/321 380/279 |
| 2015/0358157 A1 * | 12/2015 | Zhang | H04L 9/0841 380/278 |
| 2016/0182459 A1 * | 6/2016 | Britt | H04W 12/35 713/171 |
| 2017/0171607 A1 | 6/2017 | Britt | |
| 2017/0279620 A1 * | 9/2017 | Kravitz | H04L 63/0876 |
| 2018/0006829 A1 | 1/2018 | Kravitz et al. | |
| 2018/0212970 A1 * | 7/2018 | Chen | H04L 9/3236 |
| 2018/0288015 A1 * | 10/2018 | Kudaraya | H04L 61/5092 |
| 2019/0014104 A1 * | 1/2019 | Brands | H04L 63/0853 |
| 2019/0058586 A1 * | 2/2019 | Kumar | H04L 67/34 |
| 2019/0104172 A1 * | 4/2019 | Wu | G06F 8/63 |
| 2019/0124512 A1 * | 4/2019 | Phan | H04W 12/35 |
| 2019/0156019 A1 * | 5/2019 | Chen | H04W 12/0433 |
| 2019/0250899 A1 * | 8/2019 | Riedl | H04L 9/0825 |
| 2019/0253243 A1 * | 8/2019 | Zimmerman | H04W 4/70 |
| 2019/0260594 A1 * | 8/2019 | Singhal | H04L 9/3073 |
| 2019/0266278 A1 * | 8/2019 | Park | G06F 16/24564 |
| 2019/0289002 A1 * | 9/2019 | Vegh | H04L 63/0823 |

FOREIGN PATENT DOCUMENTS

| | | |
|---|---|---|
| CN | 103532963 A | 1/2014 |
| CN | 103812869 A | 5/2014 |
| CN | 104283881 A | 1/2015 |
| CN | 105119785 | 12/2015 |
| CN | 105162772 A | 12/2015 |
| CN | 106453648 A | 2/2017 |
| CN | 106899571 A | 6/2017 |
| CN | 107370597 A | 11/2017 |
| CN | 107483301 A | 12/2017 |
| CN | 104660498 | 10/2018 |

OTHER PUBLICATIONS

Translation of Written Opinion for corresponding PCT Application No. PCT/CN2019/082261 dated Jul. 10, 2019, a counterpart foreign application for U.S. Appl. No. 17/072,608, 3 pages.

Translation of CN 1st Office Action for corresponding CN Application No. 201810343519.8 dated Jul. 5, 2021, a counterpart foreign application for U.S. Appl. No. 17/072,608, 5 pages.

Translation of CN 1st Search Report for corresponding CN Application No. 201810343519.8 dated Jun. 29, 2021, a counterpart foreign application for U.S. Appl. No. 17/072,608, 2 pages.

Translation of CN 2nd Office Action for corresponding CN Application No. 201810343519.8 dated Mar. 3, 2022, a counterpart foreign application for U.S. Appl. No. 17/072,608, 9 pages.

Translation of CN Supplementary Search Report for corresponding CN Application No. 201810343519.8 dated Feb. 25, 2022, a counterpart foreign application for U.S. Appl. No. 17/072,608, 1 page.

* cited by examiner

RESPECTIVELY ESTABLISH COMMUNICATION CONNECTIONS OF TRUSTED DEVICE WITH FIRST INTERNET OF THINGS DEVICE AND WITH SECOND INTERNET OF THINGS DEVICE
202

PROVIDE FIRST COMMUNICATION KEY TO FIRST INTERNET OF THINGS DEVICE AND/OR SECOND INTERNET OF THINGS DEVICE, SUCH THAT FIRST INTERNET OF THINGS DEVICE AND SECOND INTERNET OF THINGS DEVICE MAY PERFORM ENCRYPTED COMMUNICATION ON BASIS OF FIRST COMMUNICATION KEY
204

FIG. 2

METHOD AND APPARATUS FOR COMMUNICATION BETWEEN INTERNET OF THINGS DEVICES

CROSS REFERENCE TO RELATED APPLICATIONS

This application claims priority to and is a continuation of PCT Patent Application No. PCT/CN2019/082261, filed on 11 Apr. 2019 and entitled "METHOD AND APPARATUS FOR COMMUNICATION BETWEEN INTERNET OF THINGS DEVICES," which claims priority to Chinese Patent Application No. 201810343519.8, filed on 17 Apr. 2018 and entitled "METHOD AND APPARATUS FOR COMMUNICATION BETWEEN INTERNET OF THINGS DEVICES," which are incorporated herein by reference in their entirety.

TECHNICAL FIELD

The present disclosure relates to the technical field of the Internet of Things, and, more particularly, to methods and apparatuses for communication between the Internet of Things devices.

BACKGROUND

With the development of the Internet of Things technology, various applications of Internet of Things devices are more widely used. Communication is required between Internet of Things devices to implement the interaction therebetween.

In conventional techniques, the Internet of Things devices are directly connected and communicate in plaintext, but plaintext communication is prone to data leakage, which results in less secure communication.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

In view of the above problems, the present disclosure provides a communication method and apparatus between Internet of Things devices to overcome the aforementioned problems.

The present disclosure provides a communication method between Internet of Things devices, the method comprises:

establishing a communication connection of a first Internet of Things device with a trusted device;

acquiring a first communication key, the first communication key being provided to the first Internet of Things device and/or a second Internet of Things device via the trusted device; and performing, on the basis of the first communication key, encrypted communication with the second Internet of Things device.

For example, the first communication key is generated by the first Internet of Things device;

the acquiring a first communication key comprises:

respectively acquiring a first key generation parameter from at least one of the trusted device, the first Internet of Things device, and the second Internet of Things device; and generating, according to the acquired first key generation parameter, the first communication key.

For example, the first communication key is generated by the trusted device or the second Internet of Things device; and the acquiring a first communication key comprises:

acquiring, from the trusted device, the first communication key generated by the trusted device or the second Internet of Things device.

For example, a list of trusted authentication identifiers is stored in the first Internet of Things device;

before the performing, on the basis of the first communication key, encrypted communication with the second Internet of Things device, the method further comprises:

acquiring a trusted authentication identifier provided by the second Internet of Things device; and determining that the trusted authentication identifier is present in the list of trusted authentication identifiers.

For example, the performing, on the basis of the first communication key, encrypted communication with the second Internet of Things device comprises:

encrypting, on the basis of the first communication key, communication data of the first Internet of Things device, and sending the encrypted communication data to the second Internet of Things device; or decrypting, on the basis of the first communication key, communication data of the second Internet of Things device.

For example, the establishing a communication connection of the first Internet of Things device with the trusted device comprises:

acquiring verification information from the trusted device; and completing trusted verification with the trusted device according to the verification information.

For example, the verification information comprises a digital certificate, and the completing trust verification with the trusted device according to the verification information comprises:

determining, according to a preset root certificate, that the digital certificate passes verification.

For example, the method further comprises:

acquiring a digital signature from the trusted device; and determining, according to the digital signature, integrity of the verification information.

For example, the verification information is encrypted using a cloud private key; and before the completing trusted verification with the trusted device according to the verification information, the method further comprises:

decrypting the verification information according to a cloud public key corresponding to the cloud private key.

For example, the method further comprises:

acquiring a second communication key to perform, on the basis of the second communication key, encrypted communication with the trusted device.

For example, the second communication key is generated by the first Internet of Things device;

the acquiring a second communication key comprises:

respectively acquiring a second key generation parameter from at least one of the trusted device and the first Internet of Things device; and generating the second communication key according to the acquired second key generation parameter.

For example, the second communication key is generated by the trusted device; and the acquiring a second communication key comprises:

acquiring the second communication key from the trusted device.

For example, the method further comprises:

acquiring a subscription request of a monitoring device for a property change event of the first Internet of Things device; and detecting the property change event, and notifying the monitoring device.

For example, before the acquiring a subscription request of a monitoring device for a property change event of the first Internet of Things device, the method further comprises:

providing property-related information to the monitoring device.

For example, before the detecting the property change event, the method further comprises:

detecting initial data of a property of the first Internet of Things device, and providing the data to the monitoring device.

The present disclosure further provides a communication method between Internet of Things devices, the method comprises:

respectively establishing communication connections of a trusted device with a first Internet of Things device and with a second Internet of Things device; and providing a first communication key to the first Internet of Things device and/or the second Internet of Things device, such that the first Internet of Things device and the second Internet of Things device may perform encrypted communication on the basis of the first communication key.

For example, the respectively establishing communication connections of a trusted device with a first Internet of Things device and with a second Internet of Things device comprises:

respectively providing verification information to the first Internet of Things device and the second Internet of Things device, such that the first Internet of Things device and the second Internet of Things device may respectively complete trusted verification with the trusted device.

For example, the method further comprises:

respectively providing a digital signature to the first Internet of Things device and the second Internet of Things device, such that the first Internet of Things device and the second Internet of Things device may verify integrity of the verification information.

For example, the first communication key is generated by the trusted device; and the providing a first communication key to the first Internet of Things device and/or the second Internet of Things device comprises:

sending the first communication key to the first Internet of Things device and the second Internet of Things device.

For example, the first communication key is generated by the first Internet of Things device or the second Internet of Things device; and the providing a first communication key to the first Internet of Things device and/or the second Internet of Things device comprises:

acquiring the first communication key, and sending the first communication key to the other one of the first Internet of Things device and the second Internet of Things device.

For example, the method further comprises:

acquiring a second communication key, so as to perform, on the basis of the second communication key, encrypted communication with the first Internet of Things device.

For example, the method further comprises:

acquiring a third communication key, so as to perform, on the basis of the third communication key, encrypted communication with the second Internet of Things device.

The present disclosure further provides a communication apparatus between Internet of Things devices, the apparatus comprises:

a communication connection establishment module, configured to establish a communication connection of a first Internet of Things device with a trusted device;

a first communication key acquisition module, configured to acquire a first communication key, the first communication key being provided to the first Internet of Things device and/or a second Internet of Things device via the trusted device; and a communication module, configured to perform, on the basis of the first communication key, encrypted communication with the second Internet of Things device.

For example, the first communication key is generated by the first Internet of Things device;

the first communication key acquisition module comprises:

a first key generation parameter acquisition sub-module, configured to respectively acquire a first key generation parameter from at least one of the trusted device, the first Internet of Things device, and the second Internet of Things device; and a first communication key generation sub-module, configured to generate the first communication key according to the acquired first key generation parameter.

For example, the first communication key is generated by the trusted device or the second Internet of Things device; and the first communication key acquisition module comprises:

a first communication key acquisition sub-module, configured to acquire, from the trusted device, the first communication key generated by the trusted device or the second Internet of Things device.

For example, a list of trusted authentication identifiers is stored in the first Internet of Things device;

the apparatus further comprises:

a trusted authentication identifier acquisition module, configured to acquire a trusted authentication identifier provided by the second Internet of Things device; and a first determining module, configured to determine that the trusted authentication identifier is present in the list of trusted authentication identifiers.

For example, the communication connection establishment module comprises:

a verification information acquisition sub-module, configured to acquire verification information from the trusted device; and a trust verification sub-module, configured to complete trust verification with the trusted device according to the verification information.

For example, the apparatus further comprises:

a second communication key acquisition module, configured to acquire a second communication key, so as to perform, on the basis of the second communication key, encrypted communication with the trusted device.

For example, the apparatus further comprises:

a subscription request acquisition module, configured to acquire a subscription request of a monitoring device for a property change event of the first Internet of Things device; and a property change event detection module, configured to detect the property change event and notify the monitoring device.

The present disclosure further provides a communication apparatus between Internet of Things devices, the apparatus comprises:

a communication connection establishment module, configured to respectively establish communication connections of a trusted device with a first Internet of Things device and with a second Internet of Things device; and a first communication key providing module, configured to provide a first communication key to the first Internet of Things device and/or the second Internet of Things device, such that the first Internet of Things device and the second Internet of Things device may perform encrypted communication on the basis of the first communication key.

For example, the communication connection establishment module comprises:

a verification information providing sub-module, configured to respectively provide verification information to the first Internet of Things device and the second Internet of Things device, such that the first Internet of Things device and the second Internet of Things device may respectively complete trust verification with the trusted device.

For example, the first communication key is generated by the trusted device; and the first communication key providing module comprises:

a first communication key sending sub-module, configured to send the first communication key to the first Internet of Things device and the second Internet of Things device.

For example, the first communication key is generated by the first Internet of Things device or the second Internet of Things device; and the first communication key providing module comprises:

a first communication key sending sub-module, configured to acquire the first communication key and send the first communication key to the other one of the first Internet of Things device and the second Internet of Things device.

The present disclosure further provides a computing device, comprising a memory, a processor, and a computer program stored on the memory and executable by the processor; and the processor executes one or more methods described above when executing the computer program.

The present disclosure further provides a computer-readable storage medium having a computer program stored thereon, and the computer program implements one or more of the above described methods when being executed by a processor.

In embodiments of the present disclosure, a communication connection between the first Internet of Things device and the trusted device may be established for acquisition of the first communication key. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. Thus, security and reliability of communication between the first Internet of Things device and the second Internet of Things device are enhanced.

The above description is only an overview of the technical solutions of the present disclosure. In order to better understand the technical means of the present disclosure, and further perform implementation in accordance with the content of the specification, and in order to make the above and other purposes, features, and advantages of the present disclosure more obvious and understandable, the example implementation manners of the present disclosure are illustrated below.

BRIEF DESCRIPTION OF DRAWINGS

By providing the detailed description of the example implementation manners below, one of ordinary skill in the art will have a clear understanding of other advantages and benefits. The drawings are merely for the purpose of showing the example implementation manners, and should not be considered as limiting the present disclosure. Same reference numerals refer to same elements throughout the drawings. In the drawings:

FIG. 2 shows a flowchart of a communication method between Internet of Things devices according to an example embodiment of the present disclosure;

DESCRIPTION OF EMBODIMENTS

Figure 1:
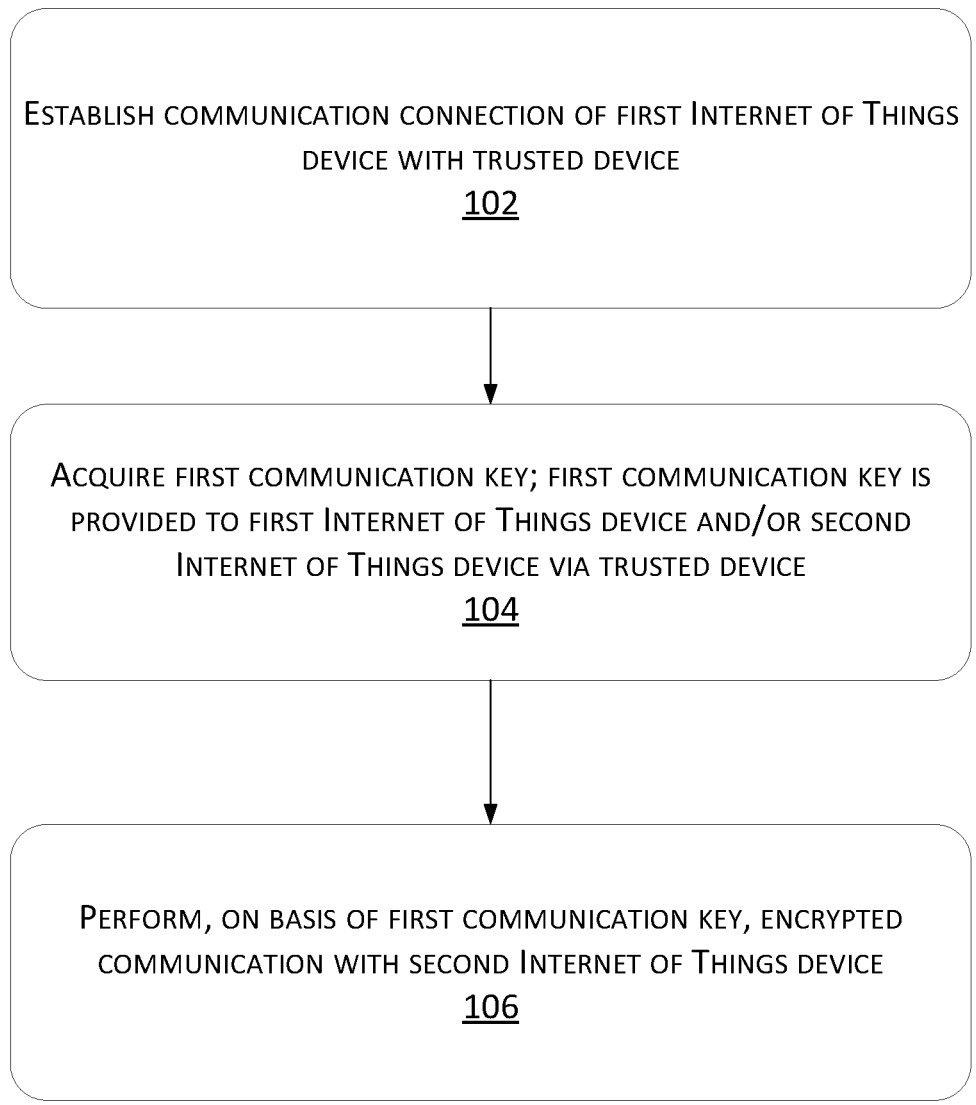
FIG. 1 shows a flowchart of a communication method between Internet of Things devices according to an example embodiment of the present disclosure.

Hereinafter, example embodiments of the present disclosure will be described in more detail with reference to the accompanying drawings. Although the drawings show example embodiments of the present disclosure, it should be understood that the present disclosure can be embodied in various forms and should not be limited by the embodiments set forth herein. Rather, these embodiments are provided to enable a more thorough understanding of the present disclosure and to fully convey the scope of the present disclosure to those skilled in the art.

In order to facilitate in-depth understanding of the embodiments of the present disclosure for those skilled in the art, the definitions of technical terms involved in an embodiments of the present disclosure will be first introduced as follows.

An Internet of Things device may include a VR (Virtual Reality) device, a tablet computer, an e-book reader, an MP3 (Moving Picture Experts Group Audio Layer III) player, an MP4 (Moving Picture Experts Group Audio Layer IV) player, a laptop computer, an on-board computer, a set-top box, a smart TV, a wearable device, a smart lamp, a smart speaker, a home gateway, etc. The Internet of Things device may include an application program or a plug-in, and may include any of the devices in FIGS. 6 to 8 below to implement any one of the methods in FIGS. 1 to 5, so as to communicate with another Internet of Things device.

A first Internet of Things device and second Internet of Things device may be any two devices in the Internet of Things.

The application program may run in the Internet of Things device, thereby implementing the communication methods between the Internet of Things devices provided by the embodiments of the present disclosure.

The plug-in may be included in an application program running on the Internet of Things device, so as to implement the communication methods between Internet of Things devices provided in an embodiments of the present disclosure.

A trusted device is a secure, trusted device, such that the device is capable of providing a first communication key to the first Internet of Things and/or the second Internet of Things device, including generation and/or forwarding of the first communication key. The trusted device may include a client. Naturally, in practical applications, the trusted device may further provide other communication-related services or data to the first Internet of Things device and/or the second Internet of Things device, for example, providing a key generation parameter required for generating the first communication key, etc. For example, the trusted device may include a mobile phone.

A communication key is used for encrypted communication between Internet of Things devices, including encrypting communication data using the communication key and/or decrypting data using the communication key.

The embodiments of the present disclosure are applicable to scenarios of communication between Internet of Things devices. Since direct communication between Internet of Things devices by means of plaintext communication may cause problems such as data leakage, which results in less secure communication, the present disclosure provides a communication method between Internet of Things devices. In an embodiment of the present disclosure, the trusted device is capable of securely providing the first communication key to the first Internet of Things device and/or the second Internet of Things device. As a result, the first Internet of Things device is capable of establishing a communication connection with the trusted device and acquiring the first communication key; and accordingly, the second Internet of Things device is also capable of acquiring the first communication key using the same manner. That is, both the first Internet of Things device and the second Internet of Things device that are communicating are capable of acquiring the first communication key; and the first Internet of Things device is thus capable of performing encrypted communication with the second Internet of Things device on the basis of the first communication key, thereby reducing the possibility of communication data leakage between the first Internet of Things device and the second Internet of Things device. In this way, communication security between Internet of Things devices is enhanced.

It should be noted that both the first Internet of Things device and the second Internet of Things device may be in a state disconnected from the cloud, or one of the Internet of Things devices is in the state disconnected from the cloud. In such cases, since at least one of the Internet of Things devices is unable to communicate with the cloud, it is impossible to operate the Internet of Things devices from a server side to implement the interaction between the two Internet of Things devices. When both the first Internet of Things device and the second Internet of Things device are in the disconnected state or one of the two Internet of Things devices is in the state disconnected from the cloud, the solutions of the embodiments of the present disclosure are to establish a communication connection on the basis of the trusted device, and the encrypted communication between the first Internet of Things device and the second Internet of Things device may be implemented.

Referring to FIG. 1, a flow chart of a communication method between Internet of Things devices according to an embodiment of the present disclosure is shown. The example steps include the following.

Step 102. Establish a communication connection of a first Internet of Things device with a trusted device.

Since the trusted device is trusted, the communication connection between the first Internet of Things device and the trusted device may be established in order to allow both the first Internet of Things device and a second Internet of Things device to acquire a first communication key in a secure and reliable manner, thereby reducing the possibility of leaking the first communication key, enabling encrypted communication, and enhancing communication security.

The first Internet of Things device and the trusted device may set up a local area network via a router.

The communication connection between the first Internet of Things device and the trusted device may be established by means of a TCP (Transmission Control Protocol) or a UDP (User Datagram Protocol). Naturally, in practical applications, the communication connection between the first Internet of Things device and the trusted device may also be established based on other protocols.

Step 104. Acquire the first communication key. The first communication key is provided to the first Internet of Things device and/or the second Internet of Things device via the trusted device.

In order to ensure subsequent secure communication with the second Internet of Things device, the first communication key may be acquired; and the first communication key may be provided to the first Internet of Things device and/or the second Internet of Things device via the trusted device in a secure and reliable manner.

The first communication key may be generated by at least one of the first Internet of Things device, the second Internet of Things device, and the trusted device.

The first Internet of Things device, the second Internet of Things device, or the trusted device may acquire a key generation parameter from at least one of the first Internet of Things device, the second Internet of Things device, and the trusted device, and generate the first communication key according to a key generation algorithm.

The security of the generated communication key will be improved as the number of sources for key generation parameters and the number of key generation parameters increase.

The key generation parameter is a parameter required for generating the communication key. For example, the key generation parameter may include a random number or a number designated in advance.

The key generation algorithm is an algorithm for generating a key, and may be a preset key generation algorithm. Naturally, in practical applications, the key generation algorithm may also be provided by and acquired from the first Internet of Things device, the second Internet of Things device, or the trusted device.

If the first communication key is generated by the first Internet of Things device, the first communication key may be provided to the second Internet of Things device via the trusted device. If the first communication key is generated by the second Internet of Things device or the trusted device, the first communication key may be acquired via the trusted device. If the first communication key is generated by the first Internet of Things device and the second Internet of Things device, the trusted device may be used to ensure that communication keys generated by the first Internet of Things device and the second Internet of Things device are the same, for example, by providing the same key generation parameter to the first Internet of Things device and the second Internet of Things device, or by ensuring that the key generation parameters and the key generation algorithms used by the first Internet of Things device and the second Internet of Things device are consistent.

Step 106. Perform, on the basis of the first communication key, encrypted communication with the second Internet of Things device.

Since both the first Internet of Things device and the second Internet of Things device have acquired the first communication key in a safe and reliable manner, the first Internet of Things device is capable of performing, on the basis of the first communication key, encrypted communication for communication data with the second Internet of Things device, thereby ensuring security and reliability of communication.

The first Internet of Things device may encrypt communication data to be sent to the second Internet of Things device by means of the first communication key, and decrypt communication data received from the second Internet of Things device by means of the same, thereby achieving encrypted communication.

In embodiments of the present disclosure, a communication connection between the first Internet of Things device and the trusted device may be established for acquisition of the first communication key. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. In this way, security and reliability of communication between the first Internet of Things device and the second Internet of Things device are enhanced.

Referring to FIG. 2, a flow chart of a communication method between Internet of Things devices according to an embodiment of the present disclosure is shown. The example steps include the following.

Step 202. Respectively establishing communication connections of a trusted device with a first Internet of Things device and a second Internet of Things device.

Since the trusted device is trusted, the communication connections of the trusted device with the first Internet of Things device and with the second Internet of Things device may be established in order to allow both the first Internet of Things device and the second Internet of Things device to acquire a first communication key in a secure and reliable manner, thereby enabling encrypted communication and enhancing communication security.

The trusted device may determine the first Internet of Things device and the second Internet of Things device from the Internet of Things, such as determining the first Internet of Things device and the second Internet of Things device by receiving a user designation, a random selection, or receiving a cloud designation. Naturally, in actual applications, the first Internet of Things device and the second Internet of Things device may also be determined in other ways. For example, if a connection request of Internet of Things device is received, the Internet of Things device is determined as the first Internet of Things device, and another Internet of Things device designated by said Internet of Things device and with which encrypted communication is required is determined as the second Internet of Things device. After the first Internet of Things device and the second Internet of Things device are determined, the communication connections to the first Internet of Things device and the second Internet of Things device may be established respectively.

The cloud may be implemented as a server or a server cluster. The cloud is capable of communicating with the trusted device and providing data or services related to encrypted communication between Internet of Things devices in an embodiments of the present disclosure.

For the manner of establishing the communication connection between the trusted device and the first Internet of Things device, reference may be made to the related description in the foregoing; and the manner of establishing the communication connection between the trusted device and the second Internet of Things device may be the same as the manner of establishing the communication connection between the trusted device and the first Internet of Things. Therefore, details will not be repeated herein.

Step 204. Provide the first communication key to the first Internet of Things device and/or the second Internet of Things device, such that the first Internet of Things device and the second Internet of Things device perform encrypted communication on the basis of the first communication key.

In order to ensure the security and reliability when the first communication key is provided to the first Internet of Things device and/or the second Internet of Things device, reduce the possibility of leaking the first communication key, and accordingly enhance the security and reliability of encrypted communication performed between the first Internet of Things device and the second Internet of Things device, the trusted device may provide the first communication key to the first Internet of Things device and/or the second Internet of Things device.

If the first communication key is generated by the first Internet of Things device or the second Internet of Things device, the trusted device may provide a key generation parameter to the first Internet of Things device or the second Internet of Things device, and provide the first communication key to the other one of the first Internet of Things device and the second Internet of Things device. If the first communication key is generated by the trusted device, the trusted device may provide the first communication key to the first Internet of Things device and the second Internet of Things device. If the first communication key is generated by the first Internet of Things device and the second Internet of Things device, the trusted device ensures that the communication keys generated by the first Internet of Things device and the second Internet of Things device are the same, for example, by respectively providing the same key generation parameter to the first Internet of Things device and the second Internet of Things device, or by determining that the key generation parameters and the key generation algorithms used by the first Internet of Things device and the second Internet of Things device are consistent.

For the manner in which the first Internet of Things device and the second Internet of Things device perform encrypted communication on the basis of the first communication key, reference may be made to the related description in the foregoing. Details are not repeated herein.

In an embodiment of the present disclosure, the communication connection between the first Internet of Things device and the second Internet of Things device may be established. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. In this way, security and reliability of communication between the first Internet of Things device and the second Internet of Things device are enhanced.

Figure 3:
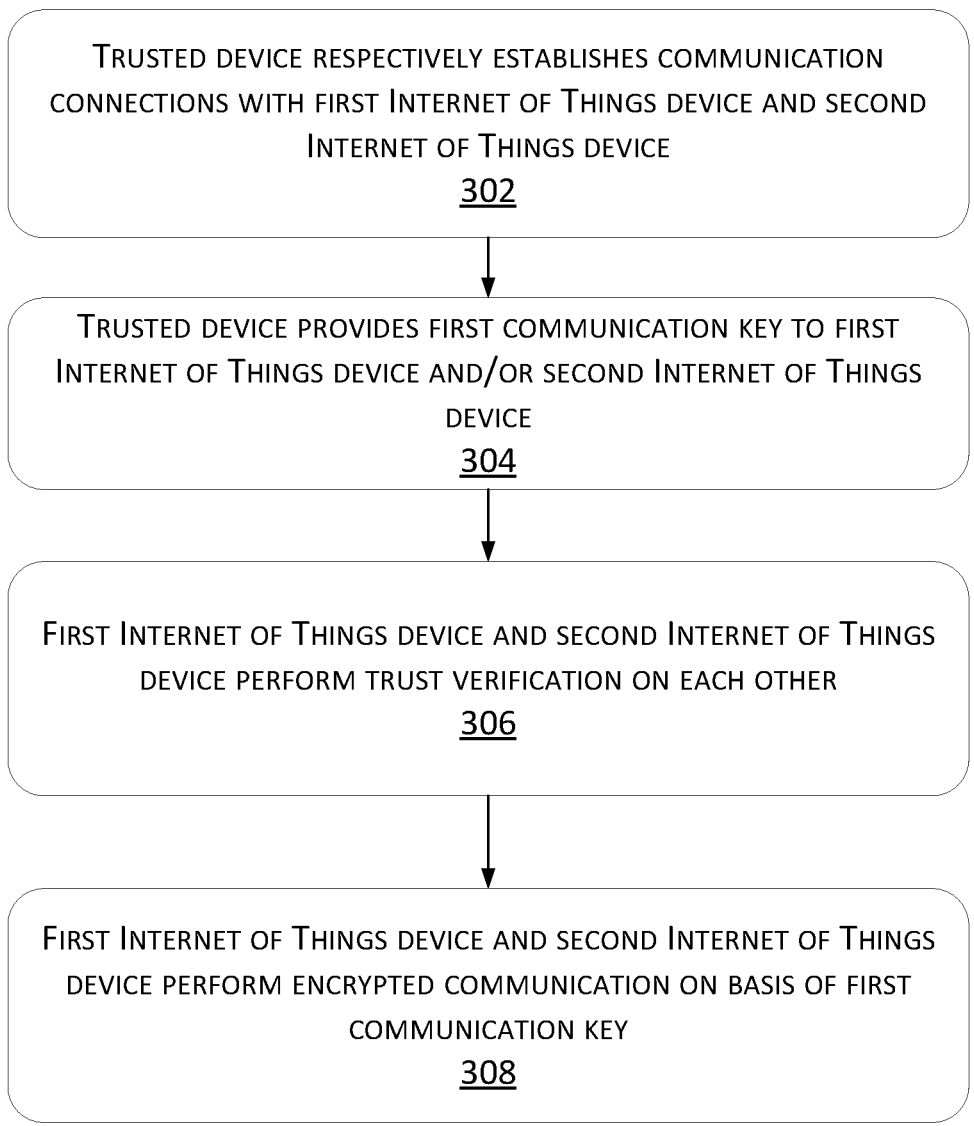
FIG. 3 shows a flowchart of a communication method between Internet of Things devices according to Embodiment an example embodiment of the present disclosure.

Referring to FIG. 3, a flow chart of a communication method between Internet of Things devices according to an embodiment of the present disclosure is shown. The example steps include the following.

Step 302. A trusted device respectively establishes communication connections with a first Internet of Things device and a second Internet of Things device.

For the manner in which the trusted device respectively establishes the communication connections to the first Internet of Things device and the second Internet of Things device, reference may be made to the related description in the foregoing. Details are not repeated herein.

In an embodiment of the present disclosure, for example, in order to make the first Internet of Things device or the second Internet of Things device determine that the trusted device is trusted, i.e., to ensure the reliability of the trusted device so as to enhance security and reliability when a first communication key is subsequently acquired, and to enhance security and reliability of encrypted communication based on the first communication key, the trusted device may respectively provide verification information to the first Internet of Things device and the second Internet of Things device, such that the first Internet of Things device and the second Internet of Things device may complete respective trust verification with the trusted device. Accordingly, the first Internet of Things device or the second Internet of Things device may acquire the verification information from the trusted device, and complete trust verification with the trusted device according to the verification information.

The verification information is information used by the trusted device for performing trust verification.

In an embodiment of the present disclosure, for example, since a digital certificate is generated by a certificate issuing platform with high authority, the verification information may include a digital certificate in order to enhance the reliability of the trust verification performed on the trusted device, and in turn enhance the security and reliability of the first communication key for encrypted communication. Accordingly, the first Internet of Things device or the second Internet of Things device may determine whether the verification of the digital certificate succeeds according to a preset root certificate.

A digital certificate is authoritative data that may be acquired from a certificate issuing platform, and the digital certificate is verifiable according to a root certificate generated by the certificate issuing platform.

The certificate issuing platform may include the aforementioned cloud. The trusted device may log into the cloud via an account corresponding to the cloud, so as to acquire the digital certificate.

The first Internet of Things device or the second Internet of Things device may acquire the root certificate in advance, for example, by a manufacturer's preset, or through a preset when deployed to the Internet of Things.

In addition, the digital certificate may further include a user identifier to indicate that the user identifier is valid for the Internet of Things devices corresponding to the digital certificate; that is, the trusted device on which the user identifier is located has a permission to access the Internet of Things device corresponding to the digital certificate. Therefore, the trusted device is trusted for the Internet of Things device.

A device identifier is used to identify a device. For example, the device identifier may include a device ID (identification) or a device serial number.

The user identifier is used to identify a user. For example, the user identifier may include a user name or a user ID. The user identifier may be obtained by receiving a user submission, and naturally may be generated by the certificate issuing platform.

For example, the trusted device logs into the certificate issuing platform, and the certificate issuing platform determines a user identifier C1 of the trusted device, a digital certificate DC1 for the first Internet of Things device M1, and a digital certificate DC2 for the second Internet of Things device M2, wherein DC1 indicates that C1 is valid for M1, and DC2 indicates that C1 is valid for M2, so as to ensure that the trusted device having C1 logged thereinto has a permission to access M1 and M2.

Naturally, in practical applications, the verification information may further include other information, such as a trusted authentication identifier.

The trusted authentication identifier is an identifier indicating whether the current device is trusted, and may include a character string. The trusted authentication identifier may include a device identifier, a user identifier of the user currently logged into the device, or may be other information indicating that the provider of the trusted authentication identifier is trusted. The trusted authentication identifier may be generated by either party participating in communication or by the certificate issuing platform, and stored at both parties of the communication. If one end determines that the local storage contains the trusted authentication identifier provided by the other end, it can be determined that the other end is trusted. Therefore, the first Internet of Things device or the second Internet of Things device may detect whether a trusted authentication identifier provided by the trusted device is stored locally; if that is the case, the trusted device is determined as trusted; otherwise, the trusted device is determined as untrusted.

The first Internet of Things device or the second Internet of Things device may acquire the trusted authentication identifier in advance, and store the trusted authentication identifier to a local list of trusted authentication identifiers. For example, the trusted device may provide the currently logged-in user identifier to the first Internet of Things device or the second Internet of Things device; and after the first Internet of Things device or the second Internet of Things device performs trust verification on the trusted device, the user identifier is seen as a trusted authentication identifier and stored in the list of trusted authentication identifiers. Afterwards, when the trusted device provides the user identifier, the trusted device can be determined as trusted.

In addition, if the trust verification of the trusted device fails, subsequent operations may be discontinued.

In an embodiment of the present disclosure, for example, in order to ensure that the verification information provided by the trusted device is intact and has not been tampered with, i.e., to ensure the integrity and reliability of the verification information, and thus to improve the reliability of the trust verification of the trusted device, the trusted device may respectively provide digital signatures to the first Internet of Things device and the second Internet of Things device, such that the first Internet of Things device and the second Internet of Things device may verify the intactness of the verification information. Accordingly, the first Internet of Things device or the second Internet of Things device may acquire a digital signature from the trusted device, and determine the integrity of the verification information according to the digital signature.

A digital signature is a digital character string that can be generated only by a data sender, and is an authenticity proof of the data sender. The digital signature has non-repudiation, thereby capable of verifying the data integrity.

The trusted device may generate digest information of communication data to be sent (such as the aforementioned verification information), encrypt the digest information using a cloud private key, and obtain a digital signature. Accordingly, the first Internet of Things device or the second Internet of Things device decrypts the digital signature on the basis of a cloud public key corresponding to the cloud private key, re-generates digest information on the basis of the received communication data, compares the generated digest information against the decrypted digest information to verify the integrity of the communication data; if the information is consistent, it is determine that the integrity of the received data is intact; otherwise, it is determined that the integrity of the received data is compromised.

The digest information may be a hash value of the communication data.

The cloud private key and cloud public key may be generated by the cloud, and the trusted device may acquire in advance the cloud private key and the cloud public key from the cloud. For example, the cloud public key and the cloud private key can be acquired during the time when the digital certificate is acquired from the cloud serving as a certificate issuing platform.

The first Internet of Things device or the second Internet of Things device may acquire the cloud public key from the aforementioned digital certificate, or the cloud public key may be preset in the first Internet of Things device or the second Internet of Things device.

In an embodiment of the present disclosure, for example, in order to ensure the security of the verification information, which in turn enhances the reliability of the trust verification performed on the trusted device, the verification information is encrypted using the cloud private key. Accordingly, the first Internet of Things device or the second Internet of Things device may decrypt the verification information according to the cloud public key corresponding to the cloud private key before completing the trust verification with the trusted device based on the verification information.

The trusted device may encrypt the communication data (such as the verification information) using the cloud private key, such that the first Internet of Things device or the second Internet of Things device is capable of decrypting the encrypted communication data using the cloud public key corresponding to the cloud, thereby ensuring the security of the communication data.

In an embodiment of the present disclosure, for example, since encrypted communication based on symmetric encryption is more efficient than encrypted communication that is based on asymmetric encryption, the trusted device and the first Internet of Things device may acquire a second communication key, and encrypted communication may be performed between the trusted device and the first Internet of Things device on the basis of the second communication key, thereby improving efficiency of the encrypted communication between the trusted device and the first Internet of Things device.

The second communication key is a communication key used for the encrypted communication of the trusted device with the first Internet of Things device. The second communication key may be generated by at least one of the trusted device and the first Internet of Things device.

In an embodiment of the present disclosure, for example, in order to ensure that the second communication key can be generated, i.e., to improve the reliability in generating the second communication key, the second communication key may be generated by the first Internet of Things device. The first Internet of Things device may respectively acquire a second key generation parameter from at least one of the trusted device and the first Internet of Things device, and generate the second communication key according to the acquired second key generation parameter. Accordingly, the trusted device may acquire the second communication key from the first Internet of Things device.

The second key generation parameter is a key generation parameter required for generating the second communication key.

The first Internet of Things device may generate, by using a key generation algorithm, the second communication key according to the second key generation parameter.

In an embodiment of the present disclosure, for example, in order to ensure that the second communication key can be generated, i.e., to improve the reliability in generating the second communication key, the second communication key may be generated by the trusted device. The trusted device may respectively acquire a second key generation parameter from at least one of the trusted device and the first Internet of Things device, and generate the second communication key according to the acquired second key generation parameter. Accordingly, the first Internet of Things device may acquire the second communication key from the trusted device.

The manner in which the trusted device generates the second communication key may be the same as the manner in which the first Internet of Things device generates the second communication key. Details are thus not repeated herein.

In an embodiment of the present disclosure, for example, in order to reduce the possibility of leaking the second communication key and to improve the security and reliability of the encrypted communication performed on the basis of the second communication key, the second communication key may be respectively generated by the trusted device and the first Internet of Things device. The trusted device and the first Internet of Things device may respectively acquire the same second key generation parameter from at least one of the trusted device and the first Internet of Things device, and accordingly generate, by using the same key generation algorithm, the second communication key according to the acquired second key generation parameter.

The trusted device or the first Internet of Things device may respectively generate the second key generation parameter, and notify the other of the generated second key generation parameter, so as to ensure that the trusted device and the first Internet of Things device acquire the same second key generation parameter.

For example, the trusted device generates and provides a 32-bit random number R11 to M1, M1 generates and provides a 32-bit random number R21 to the trusted device, and then the trusted device and M1 may acquire the same second key generation parameters R11 and R21. The trusted device and M1 may generate a 64-bit second communication key E1 on the basis of R11 and R21 respectively.

In an embodiment of the present disclosure, for example, since encrypted communication based on symmetric encryption is more efficient than encrypted communication that is based on asymmetric encryption, the trusted device and the second Internet of Things device may acquire a third communication key, and encrypted communication may be performed between the trusted device and the third Internet of Things device on the basis of the third communication key, thereby improving efficiency of the encrypted communication between the trusted device and the second Internet of Things device.

The manner in which the trusted device and the second Internet of Things device acquire the third communication key may be the same as the manner in which the trusted device and the first Internet of Things device acquire the second communication key. Details are thus not repeated herein.

For example, the trusted device may generate a 32-bit random number R31, and send R31 to M2; and M2 generates a 32-bit random number R32 and sends R32 to the trusted device. The trusted device and M2 respectively generate a 64-bit third communication key E3 according to R31 and R32 (R31 and R32 being the third key generation parameters).

Step 304. The trusted device provides a first communication key to the first Internet of Things device and/or the second Internet of Things device.

In order to ensure the security and reliability when the first communication key is provided to the first Internet of Things device and/or the second Internet of Things device, reduce the possibility of leaking the first communication key, and accordingly enhance the security and reliability of encrypted communication performed between the first Internet of Things device and the second Internet of Things device, the trusted device may provide the first communication key to the first Internet of Things device and/or the second Internet of Things device. The first Internet of Things device and/or the second Internet of Things device may then acquire the first communication key.

In an embodiment of the present disclosure, for example, in order to ensure that the first communication key can be generated, i.e., to improve the reliability in generating the first communication key, the first communication key may be generated by the trusted device. The trusted device may respectively acquire a first key generation parameter from at least one of the trusted device, the first Internet of Things device, and the second Internet of Things device, and generate the first communication key according to the acquired first key generation parameter. The first Internet of Things device and the second Internet of Things device may acquire, from the trusted device, the first communication key generated by the trusted device; and accordingly, the trusted device may send the first communication key to the first Internet of Things device and the second Internet of Things device.

The first key generation parameter is a key generation parameter required for generating the first communication key.

The first Internet of Things device or the second Internet of Things device may generate the first key generation parameter, and send the generated first key generation parameter to the trusted device. In order to ensure the security of the first key generation parameter, either the first Internet of Things device or the second Internet of Things device may also encrypt the first key generation parameter to be sent. For example, the first Internet of Things device may encrypt the first key generation parameter using the second communication key.

In an embodiment of the present disclosure, for example, in order to ensure that the first communication key can be generated, i.e., to improve the reliability in generating the first communication key, the first communication key may be generated by the first Internet of Things device. The first Internet of Things device may respectively acquire the first key generation parameter from at least one of the trusted device, the first Internet of Things device, and the second Internet of Things device, and generate the first communication key according to the acquired first key generation parameter. The trusted device may acquire the first communication key and send the first communication key to the other one of the second Internet of Things devices. Accordingly, second Internet of Things devices may acquire, from the trusted device, the first communication key generated by the second Internet of Things device.

The trusted device may generate the first key generation parameter and send the first key generation parameter to the first Internet of Things device. The second Internet of Things device may generate the first key generation parameter and send the first key generation parameter to the trusted device; and the trusted device may forward the first key generation parameter to the first Internet of Things device.

For example, M1 generates a 32-bit random number R21; the trusted device generates a 32-bit random number R22, and sends R22 to M1; and M1 generates a 64-bit first communication key E2 according to R21 and R22. M1 may send E2 to the trusted device, and the trusted device may send E2 to M2.

In an embodiment of the present disclosure, for example, in order to ensure that the first communication key can be generated, i.e., to improve the reliability in generating the first communication key, the first communication key may be generated by the second Internet of Things device. The second Internet of Things device may respectively acquire the first key generation parameter from at least one of the trusted device, the first Internet of Things device, and the second Internet of Things device, and generate the first communication key according to the acquired first key generation parameter. The trusted device may acquire the first communication key and send the first communication key to the first Internet of Things device; accordingly, second Internet of Things devices may acquire, from the trusted device, the first communication key generated by the second Internet of Things device.

The manner in which the second Internet of Things device acquires the first key generation parameter and generates the first communication key may be the same as the manner in which the first Internet of Things device acquires the first key generation parameter and generates the first communication key. Details are thus not repeated herein.

In an embodiment of the present disclosure, for example, in order to reduce the possibility of leaking the first communication key and to improve the security and reliability of the first communication key and of the encrypted communication performed on the basis of the first communication key, the first communication key is generated by the first Internet of Things device and the second Internet of Things device. The first Internet of Things device and the second Internet of Things device may respectively acquire the first key generation parameter from at least one of the trusted device, the first Internet of Things device, and the second Internet of Things device, then determine, by means of the trusted device, that the first key generation parameter and the key generation algorithm to be used are the same, and finally use a first key parameter to generate the first communication key following the key generation algorithm.

If the first key generation parameter is generated by the first Internet of Things device or the second Internet of Things device, the first key generation parameter may be provided to the other one of the first Internet of Things device and the second Internet of Things device by the trusted device; if the first key generation parameter is generated by the trusted device, the first key generation parameter may be respectively sent to the first Internet of Things device and the second Internet of Things device, so as to ensure that the first Internet of Things device and the second Internet of Things device use the same first key generation parameter.

Step 306. The first Internet of Things device and the second Internet of Things device perform trust verification on each other.

In order to reduce the possibility of an Internet of Things device communicating with an untrusted Internet of Things device, and further enhance the communication security and reliability, the first Internet of Things device and the second Internet of Things device may perform trust verification on each other.

In an embodiment of the present disclosure, for example, in order to reduce the possibility of the first Internet of Things device communicating with untrusted Internet of Things devices, and to further enhance the communication security and reliability, the first Internet of Things device has a list of trusted authentication identifiers stored therein. Accordingly, the first Internet of Things device may acquire a trusted authentication identifier provided by the second Internet of Things device, and determine that the trusted authentication identifier is present in the list of trusted authentication identifiers. If it is determined that the trusted authentication identifier is present in the list of trusted authentication identifiers, it is determined that the second Internet of Things device is trusted; otherwise, it is determined that the second Internet of Things device is untrusted.

The first Internet of Things device may acquire in advance a device identifier or user identifier of the second Internet of Things device as a trusted authentication identifier. Alternatively, the first Internet of Things device may generate a character string as a trusted authentication identifier, and provide the trusted authentication identifier to the second Internet of Things device via the trusted device. Alternatively, the second Internet of Things device, the trusted device, or the cloud serving as a certificate issuing platform generates a character string as a trusted authentication identifier; and the first Internet of Things device acquires and stores the trusted authentication identifier via the trusted device.

If the first Internet of Things device or the second Internet of Things device acquires the trusted authentication identifier via the trusted device, the trusted authentication identifier provided by the trusted device may also be trusted since the trusted device is verified by means of a digital certificate provided by the authoritative certificate issuing platform. As a result, the trust verification between the first Internet of Things device and the second Internet of Things device may be implemented using the trusted device as a medium.

In an embodiment of the present disclosure, for example, in order to reduce the possibility of the second Internet of Things device communicating with untrusted Internet of Things devices, and to further enhance the communication security and reliability, the second Internet of Things device has a list of trusted authentication identifiers stored therein. Accordingly, the second Internet of Things device may acquire a trusted authentication identifier provided by the first Internet of Things device, and determine that the trusted authentication identifier is present in the list of trusted authentication identifiers. If it is determined that the trusted authentication identifier is present in the list of trusted authentication identifiers, it is determined that the first Internet of Things device is trusted; otherwise, it is determined that the first Internet of Things device is untrusted.

The second Internet of Things device may acquire in advance a device identifier or user identifier of the first Internet of Things device as a trusted authentication identifier. Alternatively, the second Internet of Things device may generate a trusted authentication identifier, and provide the trusted authentication identifier to the first Internet of Things device via the trusted device. Alternatively, the first Internet of Things device, the trusted device, or the cloud serving as a certificate issuing platform generates a character string as a trusted authentication identifier; and the second Internet of Things device acquires and stores the trusted authentication identifier via the trusted device.

For example, the trusted device randomly generates a trusted authentication identifier C2, provides C2 to M1 and M2, and M1 and M2 acquire C2 and store C2 in a local trusted authentication list. Taking M1 as an example. If M1 receives C2 provided by M2, M2 may be determined as trusted since C2 is stored in the trusted authentication list stored locally by M1. Similarly, M2 may also determine that M1 is trusted, thereby completing the trust verification between M1 and M2.

In addition, in another optional embodiment of the present disclosure, in order to enhance the efficiency of encrypted communication, the first Internet of Things device and the second Internet of Things device may choose not to perform trust verification on each other. That is, step 306 is an optional step.

Step 308. The first Internet of Things device and the second Internet of Things device perform encrypted communication on the basis of the first communication key.

Since the first Internet of Things device and the second Internet of Things device acquire the first communication key in a safe and reliable manner, encrypted communication may be performed using the first communication key, thereby ensuring the security of communication data.

In an embodiment of the present disclosure, for example, in order to ensure the security of communication data between the first Internet of Things device and the second Internet of Things device, the first Internet of Things device may encrypt, on the basis of the first communication key, communication data of the first Internet of Things device, and send the data to the second Internet of Things device, or decrypt communication data from the second Internet of Things device on the basis of the first communication key. Accordingly, the second Internet of Things device may encrypt communication data of the second Internet of Things device on the basis of the first communication key and send the data to the first Internet of Things device, or decrypt communication data of the first Internet of Things device on the basis of the first communication key.

The communication data may carry a trusted authentication identifier, such that the first Internet of Things device or the second Internet of Things device determines that the communication data is from a trusted source.

In an embodiment of the present disclosure, for example, an Internet of Things device may possess variable properties. Therefore, the first Internet of Things device may acquire a subscription request of a monitoring device for a property change event of the first Internet of Things device, so as to detect the property change event, and to notify the monitoring device. As a result, the properties of the Internet of Things device may be perceived by users in real time and the effectiveness of acquiring the properties of the Internet of Things device may be enhanced, which in turn improves synchronization performance between the monitoring device and the Internet of Things device.

The properties of the Internet of Things device are properties possessed by the Internet of Things device. For example, if the Internet of Things device is a smart light bulb, the properties of the Internet of Things device may include the on/off state, the light color, or the light brightness. If the Internet of Things device is an air conditioner, the properties of the Internet of Things device may include the on/off state, the operating mode, the temperature setting value, and the like.

The monitoring device is a device that monitors the properties of the Internet of Things device, and the monitoring may include a client or the second Internet of Things device.

The property change event is an event generated by an Internet of Things device according to a change in the properties.

The subscription request for the property change event is a request from the monitoring device to the Internet of Things device for subscribing to the property change event.

The monitoring device may send to the first Internet of Things device the subscription request for the property change event on the basis of CoAP (Constrained Application Protocol).

A property change event based on the CoAP protocol includes an event subject and event content.

The event subject may be a character string, which includes a device identifier of a target device and an event path.

The target device is the device on which the event required in the subscription occurs, such as the first Internet of Things device.

An event location is the location of the property change event in the target device.

For example, the event subject may include "/dev/{$devId}/thing/event/property/post", wherein dev is a fixed prefix, $devId is the device identifier of the target device that may be provided by the target device, and "thing/event/property/post" is the event location of the property change event on the target device. Naturally, in actual applications, the event location may further be represented in other forms.

The event content includes an event subscription, an event subscription cancellation, and an event trigger. The event content may be represented using the observe field or observe option in the CoAP protocol.

The subscription request may include the event subject and event content of the subscribed event: event subscription.

Taking the observe field as an example. The observe field is in the payload of the CoAP protocol, and the value of the observe field may show the number of times that the property change event is triggered. If the event content is event subscription, the subscription request carries an observe string format field having a non-null value.

Upon receiving the subscription request, the first Internet of Things device subscribes to the property change event according to the event location included in the property change event protocol. If the subscription is successful, the first Internet of Things device returns a subscription success message to the monitoring device, with the message type thereof being success and the subscription success message carrying an observe string format field having a non-null value. If the subscription fails, the first Internet of Things device returns a subscription failure message to the monitoring device, with the message type thereof being failure and the subscription failure message carrying the observe string format field having a non-null value.

The first Internet of Things device may return, upon detecting that the property change event is triggered, a property change event notification to the monitoring device. The property change event notification includes a subscribed property and carries the observe string format field, wherein the value of the observe field is equal to the value of the observe field in a previous property change event notification incremented by 1.

In an embodiment of the present disclosure, for example, in order to improve the accuracy of the property subscription, the subscription request may include a target property, thus only the property change event for the target property is subscribed.

The target property is a property for which subscription is desired, and the target property may be determined by the monitoring device.

Certainly, the monitoring device may also send to the first Internet of Things device a subscription cancellation request for the property change event, wherein the subscription cancellation request does not carry the observe string format field. Upon receiving the subscription cancellation request, the first Internet of Things device returns a subscription cancellation success message, with a message type thereof being success if the subscription cancellation is successful. If the subscription cancellation fails, a subscription cancellation failure message is fed back, with the message type thereof being failure.

In an embodiment of the present disclosure, for example, in order to perceive property-related information in the first Internet of Things device to facilitate the determination of whether to subscribe to the property change event or to facilitate the determination of the target property, and in turn monitor accuracy of the property of the first Internet of Things device, the first Internet of Things device may provide the property-related information to the monitoring device before acquiring the subscription request of the monitoring device for the property change event of the first Internet of Things device.

The property-related information is information related to properties possessed by Internet of Things devices, and the property-related information may include at least one of properties, value ranges of each property, subscribability, and subscription manners.

The monitoring device may send a device discovery request based on the CoAP protocol. The device discovery request may include a target device identifier, and the target device returns the property-related information to the monitoring device upon receiving the device discovery request. Therefore, when the device discovery request is received and the device discovery request is determined as carrying the device identifier of the first Internet of Things device, the first Internet of Things device may feed back the property-related information of the first Internet of Things device to the monitoring device.

In another optional embodiment of the present disclosure, the device discovery request may not carry a target device identifier; any Internet of Things device that has received the device discovery request returns property-related information to the monitoring device.

In an embodiment of the present disclosure, for example, in order to enable the monitoring device to acquire current properties possessed by the first Internet of Things device in a timely manner, and to improve the timeliness in perceiving the properties possessed by the first Internet of Things device, the first network device detects the initial data of a property of the first Internet of Things device before detecting the property change event, and provides the data to the monitoring device. Accordingly, the monitoring device may acquire the initial data of the property provided by the first Internet of Things device, display the initial data of the property using a page, and then update the displayed initial data of the property if the property change event is received.

The initial data of a property is an initial value of the property possessed by the first Internet of Things device before the property change event is detected.

In an embodiment of the present disclosure, first the communication connections between the first and second Internet of Things devices and the trusted device may be established. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. In this way, the security and reliability of communication between the first Internet of Things device and the second Internet of Things device are enhanced.

Secondly, the first Internet of Things device or the second Internet of Things device may perform trust verification on the trusted device according to the verification information, thereby ensuring the reliability of the trusted device, enhancing the security and reliability in acquiring the first communication key, and enhancing the security and reliability of encrypted communication based on the first communication key.

In addition, the first Internet of Things device and the second Internet of Things device may perform trust verification on each other, which includes verifying whether the trusted authentication identifier provided by the other end of the first Internet of Things device and the second Internet of Things device is present in a locally stored trusted identification list, thereby reducing the possibility of Internet of Things devices communicating with untrusted Internet of Things devices, and further enhancing the security and reliability in communication.

In addition, the first Internet of Things device, the second Internet of Things device, and the trusted device are all capable of generating the first communication key, thereby enhancing the reliability in generating the first communication key.

Those skilled in the art should understand that not all of the method steps in the above embodiments are indispensable. Under specific circumstances, one or more of the steps may be omitted, as long as the technical purpose of enabling encrypted communication between the Internet of Things devices can be achieved. The present disclosure does not limit the number and order of steps in an embodiments, and the scope of protection of the present disclosure shall be subject to the limitations of the claims.

In order to enable those skilled in the art to better understand the present disclosure, the following describes a communication method between Internet of Things devices according to embodiments of the present disclosure by using several examples, which includes steps as follows.

Figure 4A:
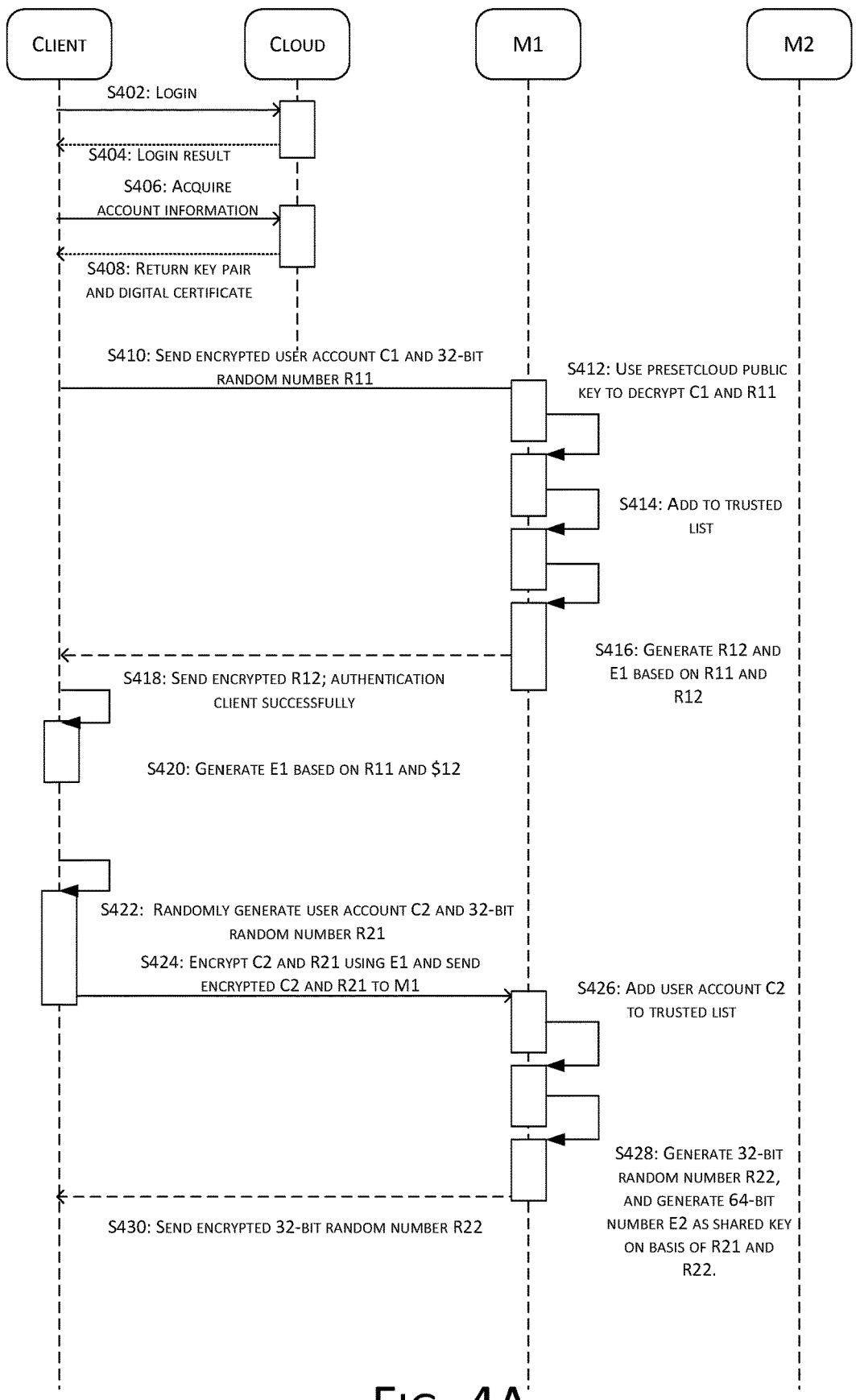
FIGS. 4A and 4B show a flowchart of a communication method between Internet of Things devices according to an embodiment of the present disclosure.
Figure 4B:
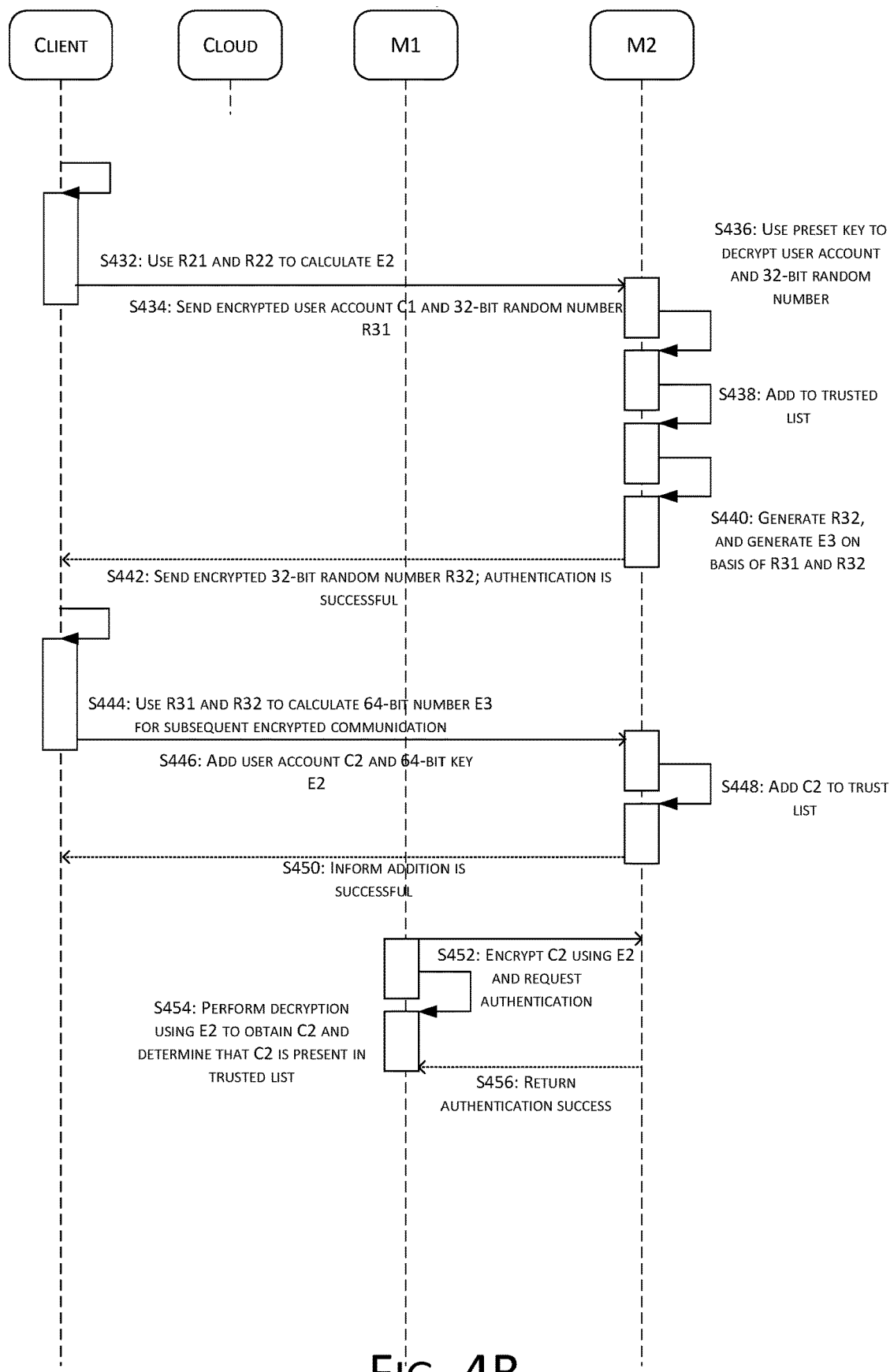

Referring to FIGS. 4A and 4B, a communication method between Internet of Things devices is shown. The example steps include the following.

S402. The client logs into the cloud, wherein the cloud may serve as a certificate issuing platform; the client may serve as a trusted device, and the client may have installed therein an application corresponding to the cloud.

S404. The cloud returns a login result to the client.

S406. The cloud acquires account information from the client;

the account information may be account information for the cloud.

S408. The cloud returns a key pair and a digital certificate to the client, wherein the cloud may generate a user account C1 according to the account information used by the client for login, and generate a digital certificate DC1 of the client for device M1 and a digital certificate DC2 of the client for device M2;

the key pair includes a cloud private key and a cloud public key.

S410. The client sends C1 and a 32-bit random number R11 to M1, wherein the sent C1 and R11 are encrypted using the cloud private key, and carry a digital signature and DC1.

S412. M1 uses a preset cloud public key to decrypt C1 and R11, wherein M1 may parse the digital certificate and verify whether the digital certificate is trusted by means of a preset root certificate; if the digital certificate is not trusted, a result is returned to the client, and the process ends; if the digital certificate is trusted, the cloud public key is extracted from the digital certificate, and whether received data has been tampered with is determined via verification based on the digital signature; if the verification fails, a result is returned to the client, and the process ends; and if the verification is successful, C1 and R11 are obtained through decryption using the cloud public key.

S414. M1 adds C1 to a trusted list.

S416. M1 generates a 32-bit random number R12, and generates a 64-bit number E1 as a shared key on the basis of R11 and R12. For example, M1 generates 32-bit random number R12, and constructs the 64-bit number E1, based on R12 and 32-bit random number sent by App, as shared key for encrypted communication S418. M1 sends the encrypted R12 to the client, and M1 authenticates the client successfully.

S420. The client acquires R12, and generates E1 on the basis of R11 and R12. The client uses R11 and R12 to calculate 64-bit number E1 for subsequent encrypted communication.

when both M1 and the client have acquired E1, M1 and the client will be able to implement encrypted communication therebetween using E1.

S422. The client randomly generates a user account C2 and a 32-bit random number R21.

S424. The client encrypts C2 and R21 using E1 and sends the encrypted C2 and R21 to M1.

S426. M1 adds C2 to the trusted list, wherein M1 may decrypt the received data using E1, so as to obtain C2 and R21.

S428. M1 generates a 32-bit random number R22, and generates a 64-bit number E2 as a shared key on the basis of R21 and R22 for encrypted communication.

S430. M1 encrypts R22 using E1 and sends the encrypted R22 to the client. M1 sends encrypted 32-bit random number R22.

S432. The client acquires R22, and generates E2 on the basis of R21 and R22. The client uses R21 and R22 to calculate E2.

S434. The client sends C1 and a 32-bit random number R31 to M2. The client sends encrypted user account C1 and 32-bit random number R31 to M2.

S436. M2 acquires C1 and R31. M2 uses preset key to decrypt user account and 32-bit random number S438. M2 adds C1 to the trusted list.

S440. M2 generates R32, and generates E3 on the basis of R31 and R32. M2 generates 32-bit random number R32, and construct, from R32 and 32-bit random number sent by App, 64-bit number E3 as shared key for encrypted communication S442. M2 encrypts R32 using E3 and sends the encrypted R32 to the client; and authentication is successful.

S444. The client generates E3 on the basis of R31 and R32. The client uses R31 and R32 to calculate 64-bit number E3 for subsequent encrypted communication.

S446. The client sends C2 and E2 to M2. The client adds user account C2 and 64-bit key E2.

S448. M2 adds C2 to the trusted list. For example, M2 adds C2 and E2 to operation-enabled list.

S450. M2 notifies the client that the addition is successful.

S452. M2 encrypts C2 using E2, and sends the encrypted C2 to M1 to request authentication.

S454. M1 performs decryption using E2 to obtain C2, and determines that C2 is present in the local trusted list.

S456. M1 returns to M2 that the authentication is successful.

After M1 and M2 have successfully performed authentication, secure and reliable communication may be implemented on the basis of C2 and E2.

Figure 5:
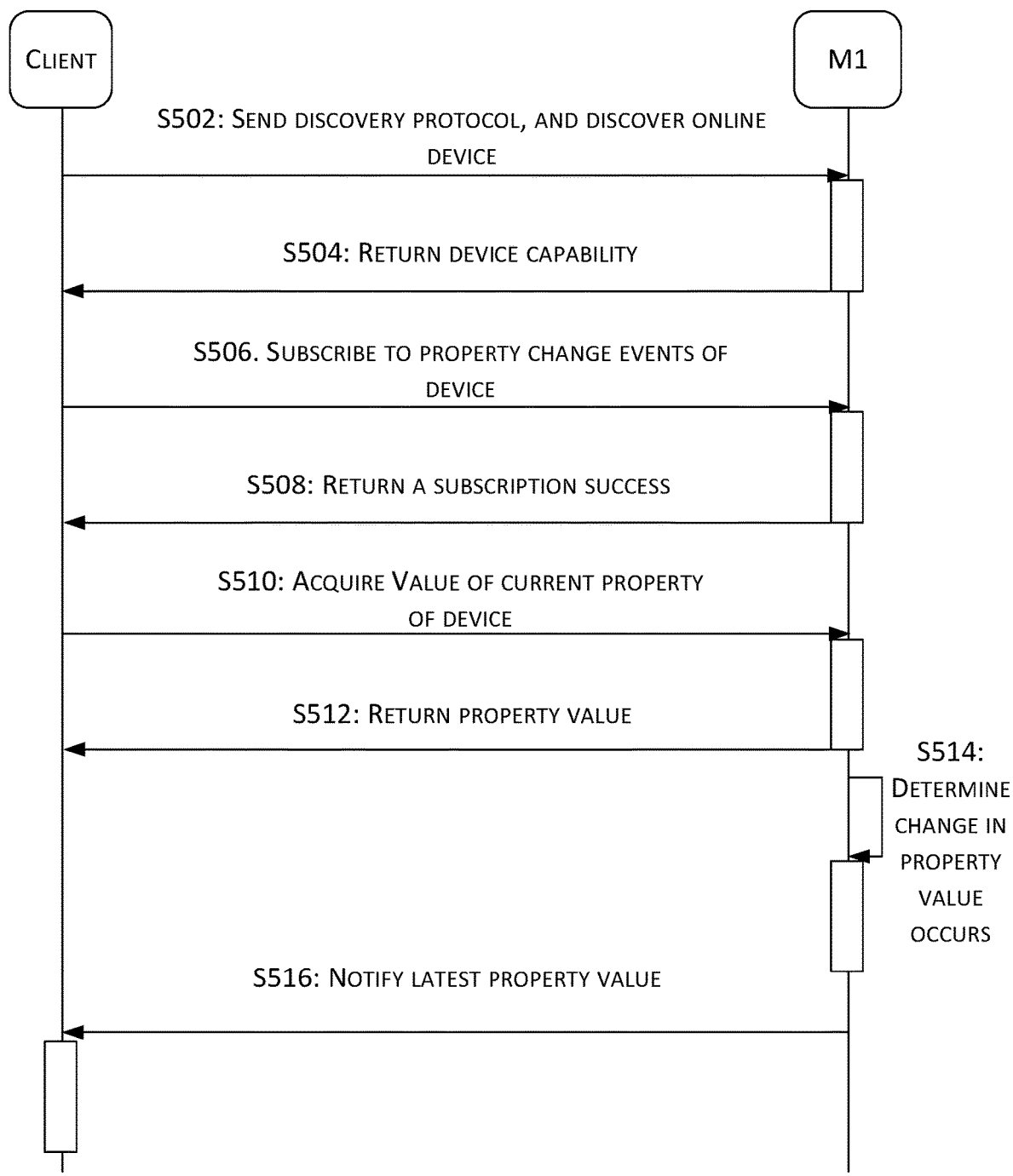
FIG. 5 shows a flowchart of another communication method between Internet of Things devices according to an embodiment of the present disclosure.

Referring to FIG. 5, a communication method between Internet of Things devices is shown. The example steps include the following.

S502. A client sends a discovery protocol and discovers an online device M1, wherein the client may send a CoAP-based discovery protocol in a network, and the discovery protocol may carry a target device identifier.

S504. M1 returns device capability;

M1 may respond to the discovery protocol after receiving the discovery protocol, and attach property-related information of M1, i.e., a description of the device capability of M1.

Apparently, if the discovery protocol carries the target device identification, M1 responds to the discovery protocol if the target device identifier is determined to be a device identifier of M1.

S506. The client subscribes to a property change event from M1.

S508. M1 returns a subscription success.

When receiving a subscription request for the property change event, M1 returns a subscription success if a property to which a subscription can be made is determined; and returns a subscription failure otherwise.

S510. The client acquires a value of a current property possessed by M1.

S512. M1 returns a property value to the client.

If acquisition of the property value is allowed for the client, M1 may return an acquisition success carrying the current property value; otherwise the acquisition fails and the process ends.

S514. M1 determines that a change in the property value occurs.

Upon determining that the property value changes, M1 proactively pushes the property change event to the client.

S516. M1 notifies the client of the latest property value.

The client may display the property value using a page, and update, upon receiving the property change event, the current property value and refresh the displayed page.

Figure 6:
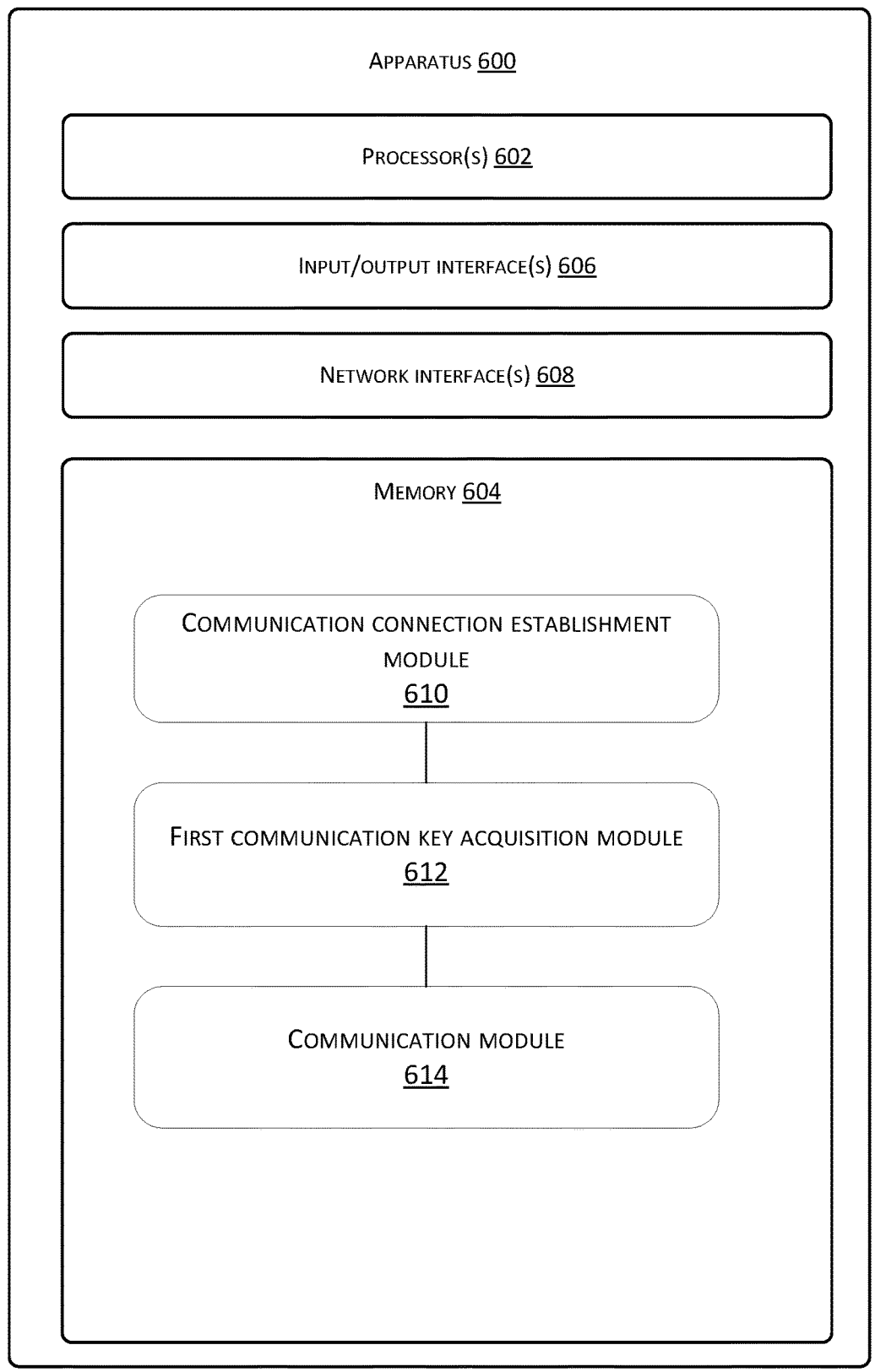
FIG. 6 shows a structural block diagram of a communication apparatus between Internet of Things devices according to an example embodiment of the present disclosure.

Referring to FIG. 6, a structural block diagram of an apparatus 600 for communication between Internet of Things devices according to an embodiment of the present disclosure is shown.

As shown in FIG. 6, the apparatus 600 includes one or more processor(s) 602 or data processing unit(s) and memory 604. The apparatus 600 may further include one or more input/output interface(s) 606 and one or more network interface(s) 608.

The memory 604 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 604 may store therein a plurality of modules or units including:

a communication connection establishment module 610, configured to establish a communication connection of a first Internet of Things device with a trusted device;

a first communication key acquisition module 612, configured to acquire a first communication key, the first communication key being provided to the first Internet of Things device and/or a second Internet of Things device via the trusted device; and a communication module 614, configured to perform, on the basis of the first communication key, encrypted communication with the second Internet of Things device.

For example, the first communication key is generated by the first Internet of Things device;

the first communication key acquisition module 612 comprises:

a first key generation parameter acquisition sub-module, configured to respectively acquire a first key generation parameter from at least one of the trusted device, the first Internet of Things device, and the second Internet of Things device; and a first communication key generation sub-module, configured to generate the first communication key according to the acquired first key generation parameter.

For example, the first communication key is generated by the trusted device or the second Internet of Things device; and the first communication key acquisition module 612 comprises:

a first communication key acquisition sub-module, configured to acquire, from the trusted device, the first communication key generated by the trusted device or the second Internet of Things device.

For example, a list of trusted authentication identifiers is stored in the first Internet of Things device;

the apparatus 600 further comprises the following modules (not shown in FIG. 6) stored in memory 604:

a trusted authentication identifier acquisition module, configured to acquire a trusted authentication identifier provided by the second Internet of Things device; and a first determining module, configured to determine that the trusted authentication identifier is present in the list of trusted authentication identifiers.

For example, the communication module 614 comprises:

an encryption sub-module, configured to encrypt, on the basis of the first communication key, communication data of the first Internet of Things device, and send the data to the second Internet of Things device; or a decryption sub-module, configured to decrypt, on the basis of the first communication key, communication data of the second Internet of Things device.

For example, the communication connection establishment module 610 comprises:

a verification information acquisition sub-module, configured to acquire verification information from the trusted device; and a trust verification sub-module, configured to complete trust verification with the trusted device according to the verification information.

For example, the verification information comprises a digital certificate, and the trust verification sub-module is further configured to:

determine, according to a preset root certificate, that the digital certificate passes verification.

For example, the apparatus 600 further comprises the following modules (not shown in FIG. 6) stored in memory 604:

a digital signature acquisition module, configured to acquire a digital signature from the trusted device; and a second determining module, configured to determine, according to the digital signature, integrity of the verification information.

For example, the verification information is encrypted using a cloud private key; and the apparatus further comprises:

a decryption module, configured to decrypt the verification information according to a cloud public key corresponding to the cloud private key.

For example, the apparatus 600 further comprises the following modules (not shown in FIG. 6) stored in memory 604:

a second communication key acquisition module, configured to acquire a second communication key, so as to perform, on the basis of the second communication key, encrypted communication with the trusted device.

For example, the second communication key is generated by the first Internet of Things device;

the second communication key acquisition module comprises:

a second key generation parameter acquisition sub-module, configured to respectively acquire a second key generation parameter from at least one of the trusted device and the first Internet of Things device; and a second communication key generation sub-module, configured to generate the second communication key according to the acquired second key generation parameter.

For example, the second communication key is generated by the trusted device; and the second communication key acquisition module comprises:

a second communication key acquisition sub-module, configured to acquire the second communication key from the trusted device.

For example, the apparatus 600 further comprises the following modules (not shown in FIG. 6) stored in memory 604:

a subscription request acquisition module, configured to acquire a subscription request of a monitoring device for a property change event of the first Internet of Things device; and a property change event detection module, configured to detect the property change event and notify the monitoring device.

For example, the apparatus 600 further comprises the following modules (not shown in FIG. 6) stored in memory 604:

a property-related information acquisition module, configured to provide property-related information to the monitoring device.

For example, the apparatus 600 further comprises the following modules (not shown in FIG. 6) stored in memory 604:

an initial data of a property detection module, configured to detect initial data of a property of the first Internet of Things device and provide the data to the monitoring device.

For example, at least one of the first Internet of Things device and the second Internet of Things device is in a state disconnected from the cloud.

In an embodiments of the present disclosure, a communication connection between the first Internet of Things device and the trusted device may be established for acquisition of the first communication key. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. In this way, the security and reliability of communication between the first Internet of Things device and the second Internet of Things device are enhanced.

Figure 7:
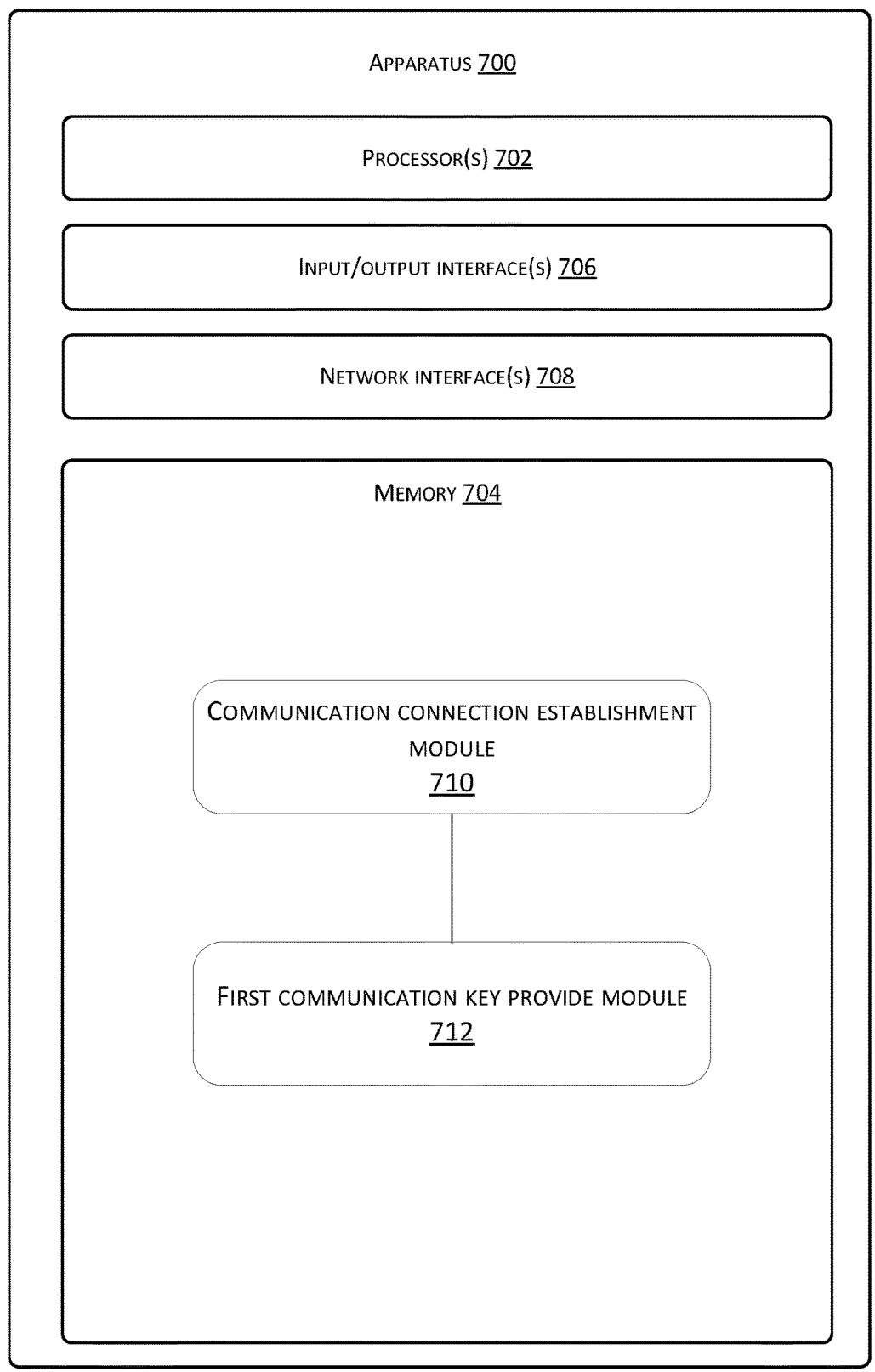
FIG. 7 shows a structural block diagram of a communication apparatus between Internet of Things devices according to an example embodiment of the present disclosure.

Referring to FIG. 7, a structural block diagram of an apparatus 700 for communication between Internet of Things devices according to an embodiment of the present disclosure is shown.

As shown in FIG. 7, the apparatus 700 includes one or more processor(s) 702 or data processing unit(s) and memory 704. The apparatus 700 may further include one or more input/output interface(s) 706 and one or more network interface(s) 708.

The memory 704 is an example of computer readable media. The memory 704 may store therein a plurality of modules or units including:

a communication connection establishment module 710, configured to respectively establish communication connections of a trusted device with a first Internet of Things device and with a second Internet of Things device; and a first communication key providing module 712, configured to provide a first communication key to the first Internet of Things device and/or the second Internet of Things device, such that the first Internet of Things device and the second Internet of Things device perform encrypted communication on the basis of the first communication key.

For example, the communication connection establishment module 710 comprises:

a verification information providing sub-module, configured to respectively provide verification information to the first Internet of Things device and the second Internet of Things device, such that the first Internet of Things device and the second Internet of Things device may respectively complete trust verification with the trusted device.

For example, the apparatus 700 further comprises the following modules (not shown in FIG. 7) stored in memory 704:

a digital signature providing module, configured to respectively provide a digital signature to the first Internet of Things device and the second Internet of Things device, such that the first Internet of Things device and the second Internet of Things device may verify integrity of the verification information.

For example, the first communication key is generated by the trusted device; and the first communication key providing module comprises:

a first communication key sending sub-module, configured to send the first communication key to the first Internet of Things device and the second Internet of Things device.

For example, the first communication key is generated by the first Internet of Things device or the second Internet of Things device; and the first communication key providing module comprises:

a first communication key sending sub-module, configured to acquire the first communication key and send the first communication key to the other one of the first Internet of Things device and the second Internet of Things device.

For example, the apparatus 700 further comprises the following modules (not shown in FIG. 7) stored in memory 704:

a second communication acquisition module, configured to acquire a second communication key, so as to perform, on the basis of the second communication key, encrypted communication with the first Internet of Things device.

For example, the apparatus 700 further comprises the following modules (not shown in FIG. 7) stored in memory 704:

a third communication key acquisition module, configured to acquire a third communication key, so as to perform, on the basis of the third communication key, encrypted communication with the second Internet of Things device.

In an embodiment of the present disclosure, the communication connection between the first Internet of Things device and the second Internet of Things device may be established. Since the trusted device is trusted, the first communication key may be provided to the first Internet of Things device and/or the second Internet of Things device via the trusted device in a secure and reliable manner, thereby ensuring that the first Internet of Things device and the second Internet of Things device are capable of acquiring the first communication key and performing encrypted communication on the basis of the first communication key accordingly. In this way, the security and reliability of communication between the first Internet of Things device and the second Internet of Things device are enhanced.

Since the apparatus embodiments are basically similar to the method embodiments, they are described in a more concise manner. For relevant content, reference may be made to the description of the method embodiments.

Figure 8:
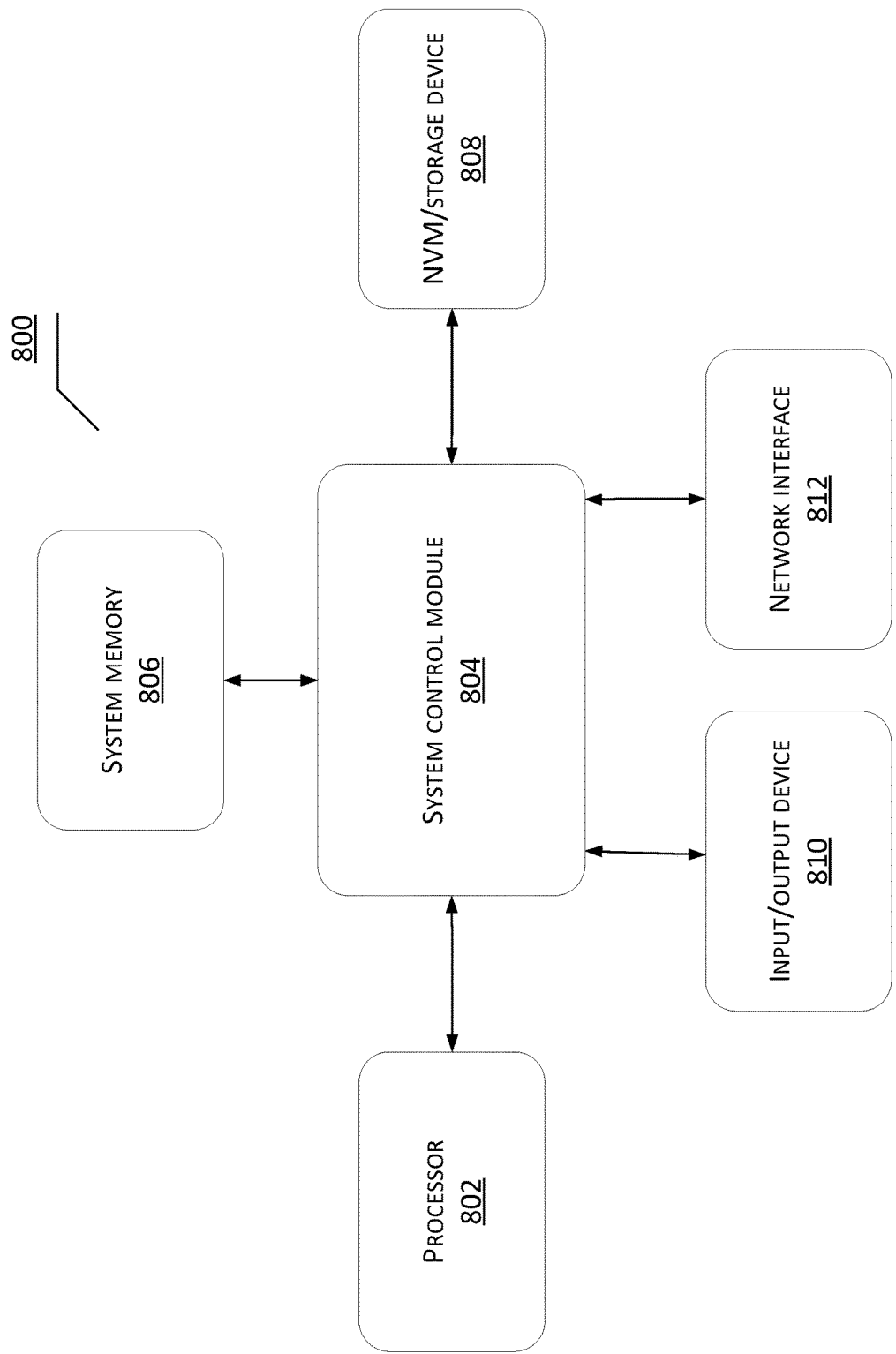
FIG. 8 shows a structural block diagram of an example system according to an embodiment of the present disclosure.

The embodiments of the present disclosure may be implemented as a system that uses any suitable hardware, firmware, software, or any combination thereof to form a desired configuration. FIG. 8 schematically shows an example system (or device) 800 that may be used to implement various embodiments described in the present disclosure.

For one embodiment, FIG. 8 shows an example system 800 having one or more processors 802, at least one system control module (chipset) 804 coupled to the (one or more) processor(s) 802, a system memory 806 coupled to the system control module 804, a non-volatile memory (NVM)/storage device 808 coupled to the system control module 804, one or more input/output devices 810 coupled to the system control module 804, and a network interface 812 coupled to system control module 806.

The processor 802 may include one or more single-core or multi-core processors, and the processor 802 may include any combination of general-purpose processor(s) or dedicated processor(s) (for example, a graphics processing unit, an application processor, a baseband processor, etc.). In some embodiments, the system 800 may serve as the communication apparatus described in an embodiments of the present disclosure.

In some embodiments, the system 800 may include one or more computer-readable media having instructions (for example, the system memory 806 or the NVM/storage device 808) and the one or more processors 802 compatible with the one or more computer-readable media and configured to execute the instructions to implement modules, and accordingly perform the actions described in the present disclosure.

For one embodiment, the system control module 804 may include any suitable interface controller to provide any suitable interface to at least one of the (one or more) processor(s) 802 and/or any suitable device or component communicating with the system control module 804.

The system control module 804 may include a memory controller module to provide an interface to the system memory 806. The memory controller module may be a hardware module, a software module, and/or a firmware module.

The system memory 806 may be used to load and store data and/or instructions for the system 800, for example. For one embodiment, the system memory 806 may include any suitable volatile memory, for example, a suitable DRAM. In some embodiments, the system memory 806 may include a double-data-rate fourth generation synchronous dynamic random-access memory (DDR4 SDRAM).

For one embodiment, the system control module 804 may include one or more input/output controllers to provide an interface to the NVM/storage device 808 and the (one or more) input/output device(s) 810.

For example, the NVM/storage device 808 may be used to store data and/or instructions. The NVM/storage device 808 may include any suitable non-volatile memory (for example, flash memory) and/or may include any suitable (one or more) non-volatile storage device(s) (for example, one or more hard disk drives (HDD), one or more compact disc (CD) drives, and/or one or more digital versatile disc (DVD) drives).

The NVM/storage device 808 may include storage resources that are physically part of the device on which the system 800 is installed, or may be accessible for the device without necessarily being part of the device. For example, the NVM/storage device 808 may be accessed by the (one or more) input/output device(s) 810 via the network.

The (one or more) input/output device(s) 810 may provide an interface to the system 800 to communicate with any other suitable device. The input/output device(s) 810 may include a communication component, audio component, sensor component, and the like. The network interface 812 may provide an interface to the system 800 to communicate via one or more networks, and the system 800 may perform wireless communication with one or more components in a wireless network according to any of one or more wireless network standards and/or protocols, for example, by accessing a wireless network based on a communication standard, such as WiFi, 2G, or 3G, or a combination thereof to perform wireless communication.

For one embodiment, at least one of the (one or more) processor(s) 802 may be packaged with the logic of one or more controllers (for example, the memory controller module) of the system control module 804. For one embodiment, at least one of the (one or more) processor(s) 802 may be packaged with the logic of one or more controllers of the system control module 804 to form a system-in-package (SiP). For one embodiment, at least one of the (one or more) processor(s) 802 may be integrated with the logic of one or more controllers of the system control module 804 on the same mold. For one embodiment, at least one of the (one or more) processor(s) 802 may be integrated with the logic of one or more controllers of the system control module 804 on the same mold to form a system-on-chip (SoC).

In various embodiments, the system 800 may be, but not limited to, a workstation, a desktop computing device, or a mobile computing device (for example, a laptop computing device, a hand-held computing device, a tablet computer, a netbook, etc.). In various embodiments, the system 800 may have more or fewer components and/or different architectures. For example, in some embodiments, the system 800 includes one or more cameras, keyboards, liquid crystal display (LCD) screens (including touch screen displays), non-volatile memory ports, multiple antennas, graphics chips, application-specific integrated circuits (ASIC), and speakers.

Herein, if the display includes a touch panel, the display screen may be implemented as a touch screen display to receive input signals from users. The touch panel includes one or more touch sensors to sense a touch, swipe, and gesture on the touch panel. The touch sensor may not only sense the boundary of a touch or swipe action, but also detect the duration and pressure related to the touch or swipe operation.

An embodiment of the present disclosure also provides a non-volatile readable storage medium, where one or more modules (programs) are stored therein, and applying the one or more modules at a terminal device enables the terminal device to execute instructions of each method step in an embodiments of the present disclosure.

In an example, an apparatus is provided, comprising: one or more processors; and one or more machine-readable media having instructions stored thereon, wherein executing the instructions by the one or more processors enables the apparatus to execute the method executed by the communication apparatus in an embodiments of the present disclosure.

In one example, one or more machine-readable media are further provided, which have instructions stored thereon, wherein executing the instructions by one or more processors enables the apparatus to execute the method executed by the communication apparatus in an embodiments of the present disclosure.

The embodiments of the present disclosure disclose a communication method and apparatus between Internet of Things devices.

Example 1. A communication method between Internet of Things devices, comprising:

establishing a communication connection of a first Internet of Things device with a trusted device;

acquiring a first communication key, the first communication key being provided to the first Internet of Things device and/or a second Internet of Things device via the trusted device; and performing, on the basis of the first communication key, encrypted communication with the second Internet of Things device.

Example 2 may include the method described in Example 1, in which the first communication key is generated by the first Internet of Things device;

the acquiring the first communication key comprises:

acquiring a first key generation parameter respectively from at least one of the trusted device, the first Internet of Things device, and the second Internet of Things device; and generating, according to the acquired first key generation parameter, the first communication key.

Example 3 may include the method described in Example 1, in which the first communication key is generated by the trusted device or the second Internet of Things device;

the acquiring the first communication key comprises:

acquiring, from the trusted device, the first communication key generated by the trusted device or the second Internet of Things device.

Example 4 may include the method described in Example 1, in which a list of trusted authentication identifiers is stored in the first Internet of Things device;

before the performing, on the basis of the first communication key, encrypted communication with the second Internet of Things device, the method further comprises:

acquiring a trusted authentication identifier provided by the second Internet of Things device; and determining that the trusted authentication identifier is present in the list of trusted authentication identifiers.

Example 5 may include the method described in Example 1, in which the performing, on the basis of the first communication key, encrypted communication with the second Internet of Things device comprises:

encrypting, on the basis of the first communication key, communication data of the first Internet of Things device, and sending the same to the second Internet of Things device; or decrypting, on the basis of the first communication key, communication data of the second Internet of Things device.

Example 6 may include the method described in Example 1, in which the establishing the communication connection of the first Internet of Things device with the trusted device comprises:

acquiring verification information from the trusted device; and completing trust verification with the trusted device according to the verification information.

Example 7 may include the method described in Example 6, in which the verification information comprises a digital certificate, and the completing trust verification with the trusted device according to the verification information comprises:

determine, according to a preset root certificate, that the digital certificate passes verification.

Example 8 may include the method described in Example 6, and the method further comprises:

acquiring a digital signature from the trusted device; and determining, according to the digital signature, integrity of the verification information.

Example 9 may include the method described in Example 6, in which the verification information is encrypted using a cloud private key; and before the completing trust verification with the trusted device according to the verification information, the method further comprises:

decrypting the verification information according to a cloud public key corresponding to the cloud private key.

Example 10 may include the method described in Example 1, and the method further comprises:

acquiring a second communication key to perform, on the basis of the second communication key, encrypted communication with the trusted device.

Example 11 may include the method described in Example 10, in which the second communication key is generated by the first Internet of Things device;

the acquiring the second communication key comprises:

acquiring a second key generation parameter respectively from at least one of the trusted device and the first Internet of Things device; and generating the second communication key according to the acquired second key generation parameter.

Example 12 may include the method described in Example 10, in which the second communication key is generated by the trusted device; and the acquiring the second communication key comprises:

acquiring the second communication key from the trusted device.

Example 13 may include the method described in Example 1, and the method further comprises:

acquiring a subscription request of a monitoring device for a property change event of the first Internet of Things device; and detecting the property change event, and notifying the monitoring device.

Example 14 may include the method described in Example 13, in which before the acquiring a subscription request of a monitoring device for a property change event of the first Internet of Things device, the method further comprises:

providing property-related information to the monitoring device.

Example 15 may include the method described in Example 13, in which before the detecting the property change event, the method further comprises:

detecting initial data of a property of the first Internet of Things device, and providing the data to the monitoring device.

Example 16 may include the method described in Example 1, in which at least one of the first Internet of Things device and the second Internet of Things device is in a state disconnected from the cloud.

Example 17. A communication method between Internet of Things devices, comprising:

respectively establishing communication connections of a trusted device with a first Internet of Things device and with a second Internet of Things device; and providing a first communication key to the first Internet of Things device and/or the second Internet of Things device, such that the first Internet of Things device and the second Internet of Things device may perform encrypted communication on the basis of the first communication key.

Example 18 may include the method described in Example 17, in which the respectively establishing communication connections of a trusted device with a first Internet of Things device and with a second Internet of Things device comprises:

respectively providing verification information to the first Internet of Things device and the second Internet of Things device, such that the first Internet of Things device and the second Internet of Things device may respectively complete trust verification with the trusted device.

Example 19 may include the method described in Example 18, and the method further comprises:

respectively providing a digital signature to the first Internet of Things device and the second Internet of Things device, such that the first Internet of Things device and the second Internet of Things device may verify integrity of the verification information.

Example 20 may include the method described in Example 17, in which the first communication key is generated by the trusted device; and the providing the first communication key to the first Internet of Things device and/or the second Internet of Things device comprises:

sending the first communication key to the first Internet of Things device and the second Internet of Things device.

Example 21 may include the method described in Example 20, in which the first communication key is generated by the first Internet of Things device or the second Internet of Things device; and the providing the first communication key to the first Internet of Things device and/or the second Internet of Things device comprises:

acquiring the first communication key, and sending the first communication key to the other one of the first Internet of Things device and the second Internet of Things device.

Example 22 may include the method described in Example 17, and the method further comprises:

acquiring a second communication key, so as to perform, on the basis of the second communication key, encrypted communication with the first Internet of Things device.

Example 23 may include the method described in Example 17, and the method further comprises:

acquiring a third communication key, so as to perform, on the basis of the third communication key, encrypted communication with the second Internet of Things device.

Example 24. A communication apparatus between Internet of Things devices, comprising:

a communication connection establishment module, configured to establish a communication connection of a first Internet of Things device with a trusted device;

a first communication key acquisition module, configured to acquire a first communication key, the first communication key being provided to the first Internet of Things device and/or a second Internet of Things device via the trusted device; and a communication module, configured to perform, on the basis of the first communication key, encrypted communication with the second Internet of Things device.

Example 25 may include the apparatus described in Example 24, in which the first communication key is generated by the first Internet of Things device;

the first communication key acquisition module comprises:

a first key generation parameter acquisition sub-module, configured to respectively acquire a first key generation parameter from at least one of the trusted device, the first Internet of Things device, and the second Internet of Things device; and a first communication key generation sub-module, configured to generate the first communication key according to the acquired first key generation parameter.

Example 26 may include the apparatus described in Example 24, in which the first communication key is generated by the trusted device or the second Internet of Things device; and the first communication key acquisition module comprises:

a first communication key acquisition sub-module, configured to acquire, from the trusted device, the first communication key generated by the trusted device or the second Internet of Things device.

Example 27 may include the apparatus described in Example 24, in which a list of trusted authentication identifiers is stored in the first Internet of Things device;

the apparatus further comprises:

a trusted authentication identifier acquisition module, configured to acquire a trusted authentication identifier provided by the second Internet of Things device; and a first determining module, configured to determine that the trusted authentication identifier is present in the list of trusted authentication identifiers.

Example 28 may include the apparatus described in Example 24, in which the communication connection establishment module comprises:

a verification information acquisition sub-module, configured to acquire verification information from the trusted device; and a trust verification sub-module, configured to complete trust verification with the trusted device according to the verification information.

Example 29 may include the apparatus described in Example 24, and the apparatus further comprises:

a second communication key acquisition module, configured to acquire a second communication key, so as to perform, on the basis of the second communication key, encrypted communication with the trusted device.

Example 30 may include the apparatus described in Example 24, and the apparatus further comprises:

a subscription request acquisition module, configured to acquire a subscription request of a monitoring device for a property change event of the first Internet of Things device; and a property change event detection module, configured to detect the property change event and notify the monitoring device.

Example 31 may include the apparatus described in Example 24, in which at least one of the first Internet of Things device and the second Internet of Things device is in a state disconnected from the cloud.

Example 32. A communication apparatus between Internet of Things devices, comprising:

a communication connection establishment module, configured to respectively establish communication connections of a trusted device with a first Internet of Things device and with a second Internet of Things device; and a first communication key providing module, configured to provide a first communication key to the first Internet of Things device and/or the second Internet of Things device, such that the first Internet of Things device and the second Internet of Things device perform encrypted communication on the basis of the first communication key.

Example 33 may include the apparatus described in Example 32, in which the communication connection establishment module comprises:

a verification information providing sub-module, configured to respectively provide verification information to the first Internet of Things device and the second Internet of Things device, such that the first Internet of Things device and the second Internet of Things device may respectively complete trust verification with the trusted device.

Example 34 may include the apparatus described in Example 32, in which the first communication key is generated by the trusted device; and the first communication key providing module comprises:

a first communication key sending sub-module, configured to send the first communication key to the first Internet of Things device and the second Internet of Things device.

Example 35 may include the apparatus described in Example 32, in which the first communication key is generated by the first Internet of Things device or the second Internet of Things device; and the first communication key providing module comprises:

a first communication key sending sub-module, configured to acquire the first communication key and send the first communication key to the other one of the first Internet of Things device and the second Internet of Things device.

Example 36. An apparatus, comprising: one or more processors; and one or more machine-readable media having instructions stored thereon, wherein executing the instructions by the one or more processors causes the apparatus to perform one or more methods of Example 1 to Example 23.

Example 35. One or more machine-readable media having instructions stored thereon, wherein executing the instructions by one or more processors causes an apparatus to perform one or more methods of Example 1 to Example 23.

Although some embodiments are for illustrative and descriptive purposes, various alternative and/or equivalent implementation manners or calculations used to achieve the same purposes of illustrating and describing the objective embodiments do not depart from the scope of implementation of the present disclosure. The present disclosure is intended to cover any modifications or changes of the embodiments discussed herein. Therefore, it is apparent that the embodiments described herein are limited only by the claims and their equivalents.

The present disclosure may further be understood with clauses as follows.

Clause 1. A communication method between Internet of Things devices, the method comprises:

establishing a communication connection of a first Internet of Things device with a trusted device;

acquiring a first communication key, the first communication key being provided to the first Internet of Things device and/or a second Internet of Things device via the trusted device; and performing, on the basis of the first communication key, encrypted communication with the second Internet of Things device.

Clause 2. The method according to clause 1, wherein the first communication key is generated by the first Internet of Things device;

the acquiring a first communication key comprises:

acquiring a first key generation parameter respectively from at least one of the trusted device, the first Internet of Things device, and the second Internet of Things device; and generating, according to the acquired first key generation parameter, the first communication key.

Clause 3. The method according to clause 1, wherein the first communication key is generated by the trusted device or the second Internet of Things device, and the acquiring a first communication key comprises:

acquiring, from the trusted device, the first communication key generated by the trusted device or the second Internet of Things device.

Clause 4. The method according to clause 1, wherein a list of trusted authentication identifiers is stored in the first Internet of Things device;

before the performing, on the basis of the first communication key, encrypted communication with the second Internet of Things device, the method further comprises:

acquiring a trusted authentication identifier provided by the second Internet of Things device; and determining that the trusted authentication identifier is present in the list of trusted authentication identifiers.

Clause 5. The method according to clause 1, wherein the performing, on the basis of the first communication key, encrypted communication with the second Internet of Things device comprises:

encrypting, on the basis of the first communication key, communication data of the first Internet of Things device, and sending the same to the second Internet of Things device; or decrypting, on the basis of the first communication key, communication data of the second Internet of Things device.

Clause 6. The method according to clause 1, wherein the establishing a communication connection of the first Internet of Things device with the trusted device comprises:

acquiring verification information from the trusted device; and completing trust verification with the trusted device according to the verification information.

Clause 7. The method according to clause 6, wherein the verification information comprises a digital certificate, and the completing trust verification with the trusted device according to the verification information comprises:

determining, according to a preset root certificate, that the digital certificate passes verification.

Clause 8. The method according to clause 6, wherein the method further comprises:

acquiring a digital signature from the trusted device; and determining, according to the digital signature, integrity of the verification information.

Clause 9. The method according to clause 6, wherein the verification information is encrypted using a cloud private key; and before the completing trust verification with the trusted device according to the verification information, the method further comprises:

decrypting the verification information according to a cloud public key corresponding to the cloud private key.

Clause 10. The method according to clause 1, wherein the method further comprises:

acquiring a second communication key, so as to perform, on the basis of the second communication key, encrypted communication with the trusted device.

Clause 11. The method according to clause 10, wherein the second communication key is generated by the first Internet of Things device; and the acquiring a second communication key comprises:

respectively acquiring a second key generation parameter from at least one of the trusted device and the first Internet of Things device; and generating the second communication key according to the acquired second key generation parameter.

Clause 12. The method according to clause 10, wherein the second communication key is generated by the trusted device; and the acquiring a second communication key comprises:

acquiring the second communication key from the trusted device.

Clause 13. The method according to clause 1, wherein the method further comprises:

acquiring a subscription request of a monitoring device for a property change event of the first Internet of Things device; and detecting the property change event, and notifying the monitoring device.

Clause 14. The method according to clause 13, wherein before the acquiring a subscription request of a monitoring device for a property change event of the first Internet of Things device, the method further comprises:

providing property-related information to the monitoring device.

Clause 15. The method according to clause 13, wherein before the detecting the property change event, the method further comprises:

detecting initial data of a property of the first Internet of Things device, and providing the data to the monitoring device.

Clause 16. The method according to clause 1, wherein at least one of the first Internet of Things device and the second Internet of Things device is in a state disconnected from a cloud.

Clause 17. A communication method between Internet of Things devices, the method comprises:

respectively establishing communication connections of a trusted device with a first Internet of Things device and with a second Internet of Things device; and providing a first communication key to the first Internet of Things device and/or the second Internet of Things device, such that the first Internet of Things device and the second Internet of Things device may perform encrypted communication on the basis of the first communication key.

Clause 18. The method according to clause 17, wherein the respectively establishing communication connections of a trusted device with a first Internet of Things device and with a second Internet of Things device comprises:

respectively providing verification information to the first Internet of Things device and the second Internet of Things device, such that the first Internet of Things device and the second Internet of Things device may respectively complete trust verification with the trusted device.

Clause 19. The method according to clause 18, wherein the method further comprises:

respectively providing a digital signature to the first Internet of Things device and the second Internet of Things device, such that the first Internet of Things device and the second Internet of Things device may verify integrity of the verification information.

Clause 20. The method according to clause 17, wherein the first communication key is generated by the trusted device; and the providing a first communication key to the first Internet of Things device and/or the second Internet of Things device comprises:

sending the first communication key to the first Internet of Things device and the second Internet of Things device.

Clause 21. The method according to clause 20, wherein the first communication key is generated by the first Internet of Things device or the second Internet of Things device; and the providing a first communication key to the first Internet of Things device and/or the second Internet of Things device comprises:

acquiring the first communication key, and sending the first communication key to the other one of the first Internet of Things device and the second Internet of Things device.

Clause 22. The method according to clause 17, wherein the method further comprises:

acquiring a second communication key, so as to perform, on the basis of the second communication key, encrypted communication with the first Internet of Things device.

Clause 23. The method according to clause 17, wherein the method further comprises:

acquiring a third communication key, so as to perform, on the basis of the third communication key, encrypted communication with the second Internet of Things device.

Clause 24. A communication apparatus between Internet of Things devices, comprising:

a communication connection establishment module, configured to establish a communication connection of a first Internet of Things device with a trusted device;

a first communication key acquisition module, configured to acquire a first communication key, the first communication key being provided to the first Internet of Things device and/or a second Internet of Things device via the trusted device; and a communication module, configured to perform, on the basis of the first communication key, encrypted communication with the second Internet of Things device.

Clause 25. The apparatus according to clause 24, wherein the first communication key is generated by the first Internet of Things device;

the first communication key acquisition module comprises:

a first key generation parameter acquisition sub-module, configured to respectively acquire a first key generation parameter from at least one of the trusted device, the first Internet of Things device, and the second Internet of Things device; and a first communication key generation sub-module, configured to generate the first communication key according to the acquired first key generation parameter.

Clause 26. The apparatus according to clause 24, wherein the first communication key is generated by the trusted device or the second Internet of Things device; and the first communication key acquisition module comprises:

a first communication key acquisition sub-module, configured to acquire, from the trusted device, the first communication key generated by the trusted device or the second Internet of Things device.

Clause 27. The apparatus according to clause 24, wherein a list of trusted authentication identifiers is stored in the first Internet of Things device;

the apparatus further comprises:

a trusted authentication identifier acquisition module, configured to acquire a trusted authentication identifier provided by the second Internet of Things device; and a first determining module, configured to determine that the trusted authentication identifier is present in the list of trusted authentication identifiers.

Clause 28. The apparatus according to clause 24, wherein the communication connection establishment module comprises:

a verification information acquisition sub-module, configured to acquire verification information from the trusted device; and a trust verification sub-module, configured to complete trust verification with the trusted device according to the verification information.

Clause 29. The apparatus according to clause 24, wherein the apparatus further comprises:

a second communication key acquisition module, configured to acquire a second communication key, so as to perform, on the basis of the second communication key, encrypted communication with the trusted device.

Clause 30. The apparatus according to clause 24, wherein the apparatus further comprises:

a subscription request acquisition module, configured to acquire a subscription request of a monitoring device for a property change event of the first Internet of Things device; and a property change event detection module, configured to detect the property change event and notify the monitoring device.

Clause 31. The apparatus according to clause 24, wherein at least one of the first Internet of Things device and the second Internet of Things device is in a state disconnected from a cloud.

Clause 32. A communication apparatus between Internet of Things devices, comprising:

a communication connection establishment module, configured to respectively establish communication connections of a trusted device with a first Internet of Things device and with a second Internet of Things device; and a first communication key providing module, configured to provide a first communication key to the first Internet of Things device and/or the second Internet of Things device, such that the first Internet of Things device and the second Internet of Things device may perform encrypted communication on the basis of the first communication key.

Clause 33. The apparatus according to clause 32, wherein the communication connection establishment module comprises:

a verification information providing sub-module, configured to respectively provide verification information to the first Internet of Things device and the second Internet of Things device, such that the first Internet of Things device and the second Internet of Things device may respectively complete trust verification with the trusted device.

Clause 34. The apparatus according to clause 32, wherein the first communication key is generated by the trusted device; and the first communication key providing module comprises:

a first communication key sending sub-module, configured to send the first communication key to the first Internet of Things device and the second Internet of Things device.

Clause 35. The apparatus according to clause 32, wherein the first communication key is generated by the first Internet of Things device or the second Internet of Things device; and the first communication key providing module comprises:

a first communication key sending sub-module, configured to acquire the first communication key and send the first communication key to the other one of the first Internet of Things device and the second Internet of Things device.

Clause 36. A computing device, comprising a memory, a processor, and a computer program stored on the memory and executable on the processor, wherein the processor implements one or more methods according to any one of clauses 1-23 when executing the computer program.

Clause 37. A computer-readable storage medium having a computer program stored thereon, wherein the computer program implements one or more methods according to any one of clauses 1-23 when being executed by a processor.

What is claimed is:

1. A method comprising:
  establishing a communication connection of a first Internet of Things (IoT) device with a trusted device;
  receiving, by the first IoT device, a first user account and a digital certificate from the trusted device, the first user account being generated by a cloud based on account information obtained from the trusted device;

storing, by the first IoT device, the first user account in a local trusted list in response to verifying that the trusted device is trusted based at least in part on the digital certificate;
receiving, by the first IoT device, a second user account from the trusted device, the second user account being generated by the trusted device and used for authenticating a second IoT device;
storing, by the first IoT device, the second user account in the local trusted list;
generating, by the first IoT device, a first communication key;
providing, by the first IoT, the first communication key to the second IoT device via the trusted device;
receiving, by the first IoT device, an encrypted version of the second user account from the second IoT device for performing an authentication of the second IoT device;
determining, by the first IoT device, that the authentication of the second IoT device is successful in response to determining that the second user account received from the second IoT device is present in the local trusted list; and
performing, by the first IoT device, encrypted communication between the first IoT device and the second IoT device based on the second user account being present in the local trusted list and the first communication key.

2. The method according to claim 1, further comprising:
Acquiring, by the first IoT device, a first key generation parameter respectively from the trusted device; and
generating, by the first IoT device, according to the acquired first key generation parameter, the first communication key.

3. The method according to claim 1, wherein:
a list of trusted authentication identifiers is stored in the first IoT device; and
before performing the encrypted communication, the method further comprises:
acquiring a trusted authentication identifier provided by the second IoT device; and
determining that the trusted authentication identifier is present in the list of trusted authentication identifiers.

4. The method according to claim 1, wherein the performing the encrypted communication comprises:
encrypting communication data of the first IoT device using the first communication key, and sending the encrypted communication data of the first IoT device to the second IoT device; or
receiving encrypted communication data of the second IoT device, and decrypting the encrypted communication data of the second IoT device using the first communication key.

5. The method according to claim 1, wherein the establishing the communication connection of the first IoT device with the trusted device comprises:
acquiring, by the first IoT device, verification information from the trusted device; and
completing, by the first IoT device, trust verification with the trusted device according to the verification information.

6. The method according to claim 5, wherein:
the verification information comprises the digital certificate; and
the completing the trust verification with the trusted device according to the verification information comprises determining, according to a preset root certificate, that the digital certificate passes verification.

7. The method according to claim 5, wherein the method further comprises:
determining, by the first IoT device, according to the digital certificate, integrity of the verification information.

8. The method according to claim 5, wherein:
the verification information is encrypted using a cloud private key; and
before the completing the trust verification with the trusted device according to the verification information, the method further comprises decrypting the verification information according to a cloud public key corresponding to the cloud private key.

9. The method according to claim 1, wherein the method further comprises:
acquiring a second communication key to perform encrypted communication with the trusted device using the second communication key.

10. The method according to claim 9, wherein:
the second communication key is generated by the first IoT device; and
the acquiring the second communication key comprises:
acquiring a second key generation parameter from at least one of the trusted device and the first IoT device; and
generating the second communication key according to the acquired second key generation parameter.

11. The method according to claim 9, wherein:
the second communication key is generated by the trusted device; and
the acquiring the second communication key comprises acquiring the second communication key from the trusted device.

12. The method according to claim 1, wherein the method further comprises:
acquiring a subscription request of a monitoring device for a property change event of the first IoT device; and
detecting the property change event, and notifying the monitoring device.

13. The method according to claim 12, wherein before the acquiring the subscription request of the monitoring device for the property change event of the first IoT device, the method further comprises:
providing property-related information to the monitoring device.

14. The method according to claim 12, wherein before the detecting the property change event, the method further comprises:
detecting initial data of a property of the first IoT device, and providing the initial data to the monitoring device.

15. The method according to claim 1, wherein at least one of the first IoT device and the second IoT device is in a state disconnected from the cloud.

16. One or more memories storing thereon computer-readable instructions that, when executed by one or more processors of a trusted device, cause the one or more processors to perform acts comprising:
respectively establishing communication connections of the trusted device with a first Internet of Things device (IoT) and with a second IoT device; and
sending a first user account and a digital certificate to the first IoT device to cause the first IoT device to store the first user account in a local trusted list of the first IoT device after the first IoT device verifies that the trusted device is trusted based at least in part on the digital certificate, the first user account being generated by a cloud based on account information obtained from the trusted device;

sending a second user account from the trusted device to the first IoT device to cause the first IoT device to store the second user account in the local trusted list of the first IoT device, the second user account being generated by the trusted device and used for authenticating a second IoT device; and receiving a first communication key from the first IoT device, and providing the first communication key to the second IoT device, to enable the first IoT device and the second IoT device to perform encrypted communication based on the second user account being present in the local trusted list and the first communication key.

17. The one or more memories according to claim 16, wherein the respectively establishing communication connections of the trusted device with the first IoT device and with the second IoT device comprises:

respectively providing verification information to the first IoT device and the second IoT device, to enable the first IoT device and the second IoT device to respectively complete trust verification with the trusted device.

18. The one or more memories according to claim 17, wherein the acts further comprises:

respectively providing the digital signature to the first IoT device and the second IoT device, to enable the first IoT device and the second IoT device to verify integrity of the verification information.

19. An apparatus implemented by a first Internet of Things device (IoT), the apparatus comprising:

one or more processors; and one or more memories storing thereon computer-readable instructions that, when executed by the one or more processors, cause the one or more processors to perform acts comprising:

establishing a communication connection with a trusted device;

receiving a first user account and a digital certificate from the trusted device, the first user account being generated by a cloud based on account information obtained from the trusted device;

storing the first user account in a local trusted list in response to verifying that the trusted device is trusted based at least in part on the digital certificate;

receiving a second user account from the trusted device, the second user account being generated by the trusted device and used for authenticating a second IoT device;

storing the second user account in the local trusted list;

generating a first communication key;

providing the first communication key to the second IoT device via the trusted device;

receiving an encrypted version of the second user account from the second IoT device for performing an authentication of the second IoT device;

determining that the authentication of the second IoT device is successful in response to determining that the second user account received from the second IoT device is present in the local trusted list; and performing encrypted communication with the second IoT device based on the second user account being present in the local trusted list and the first communication key.

20. The apparatus according to claim 19, wherein generating the first communication key comprises:

receiving a first number from the trusted device;

locally generating a second number; and generating the first communication key based on the first number and the second number, a bit length of the first communication key being a sum of respective bit lengths of the first number and the second number.

* * * * *